US007587821B2

(12) United States Patent
Terakura

(10) Patent No.: US 7,587,821 B2
(45) Date of Patent: Sep. 15, 2009

(54) METHOD OF MANUFACTURING AN INKJET HEAD

(75) Inventor: Tatsuo Terakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 333 days.

(21) Appl. No.: 11/277,153

(22) Filed: Mar. 22, 2006

(65) Prior Publication Data

US 2006/0213042 A1 Sep. 28, 2006

(30) Foreign Application Priority Data

Mar. 23, 2005 (JP) ............................ 2005-083057

(51) Int. Cl.
*B23P 17/00* (2006.01)
*B41J 2/14* (2006.01)

(52) U.S. Cl. .................... 29/890.1; 29/25.35; 29/25.42; 347/47; 347/67

(58) Field of Classification Search ................ 29/25.35, 29/890.1, 832, 831, 830; 347/20, 65, 56, 347/68-71, 47-67; 310/328, 311, 331; 216/27; 156/130, 537

See application file for complete search history.

(56) References Cited

U.S. PATENT DOCUMENTS 4,680,595 A * 7/1987 Cruz-Uribe et al. ........... 347/40
5,327,627 A * 7/1994 Ochiai et al. ............... 29/25.35
5,376,856 A * 12/1994 Takeuchi et al. ............ 310/328
5,406,318 A * 4/1995 Moore et al. .................. 347/70
5,512,793 A * 4/1996 Takeuchi et al. ............ 310/328
5,802,685 A * 9/1998 Kadota et al. .............. 29/25.35
6,672,715 B2 * 1/2004 Isono et al. ................... 347/71
6,896,361 B2 5/2005 Sugiyama
2003/0029037 A1 2/2003 Debesis et al.
2004/0095439 A1 5/2004 Takahashi
2005/0040581 A1 2/2005 Ito

OTHER PUBLICATIONS

European Search Report for European Patent Appl'n. No. 06 00 5735, completed on Jun. 19, 2006.

* cited by examiner

*Primary Examiner*—Minh Trinh
*Assistant Examiner*—Tai Nguyen
(74) *Attorney, Agent, or Firm*—Baker Botts, LLP

(57) ABSTRACT

A method of manufacturing an inkjet head at a low cost is provided. The inkjet head has a passage unit. A plurality of plates are laminated together to form the passage unit. The passage unit has individual ink passages that extend in the plate laminating direction. When the passage unit is to be manufactured, communication holes that will become individual ink passages later will first be formed in the plurality of plates that form the passage unit. All of the plates in which the communication holes are formed will be laminated together with a thermosetting adhesive. The laminated plates will be heated and pressure will be applied thereto. In this way, all of the plates will be simultaneously adhered. An ink passage unit can be manufactured in one adhesion step. The manufacturing costs of the ink passage unit can be reduced. Components such as actuator units, an ink supply unit, and the like will be attached to the manufactured ink passage unit to complete an inkjet head. An inkjet head can be manufactured at a low cost.

12 Claims, 16 Drawing Sheets

( a )

( b )

( a )

( b )

( a )

( b )

METHOD OF MANUFACTURING AN INKJET HEAD

CROSS REFERENCE TO RELATED APPLICATION

This application claims priority to Japanese Patent Application No. 2005-083057 filed on Mar. 23, 2005, the contents of which are hereby incorporated by reference into the present application.

BACKGROUND OF THE INVENTION

1. Field of the Invention

The present invention relates to a method of manufacturing an inkjet head.

2. Description of the Related Art

An inkjet bead having an ink passage unit is known. An ink passage unit is formed by stacking (laminating) a plurality of plates together. Individual ink passages and nozzles are formed in the ink passage unit. The individual ink passages pass through the laminated plates in the direction of lamination. The direction of laminating is referred to as the plate-laminating-direction hereinafter. Nozzles are formed in the end portions of the individual ink passages. That it to say, the nozzles is formed in the outermost plate of the ink passage unit. The plate laminated on the outermost plate of the ink passage unit and being formed the nozzle is referred to as the nozzle plate hereinafter. Ink flows inside the individual ink passages and is discharged from the nozzles.

The plurality of plates is usually adhered together by means of a thermosetting adhesive.

This type of method of manufacturing an inkjet head is disclosed in Japanese Patent Application Publication No. 2004-025584. According to conventional technology, the plates that constitute the ink passage unit are laminated together with a thermosetting adhesive, except for the nozzle plate. The laminated plates are pressed together in the plate-laminating-direction while being heated. The nozzle plate in which nozzles are formed is laminated and adhered to the laminated and adhered plates. A thermosetting adhesive is used even when adhering the nozzle plate. Thus, even when adhering the nozzle plate, the laminated plate unit is heated while being pressed in the plate-laminating-direction. The ink passage unit will be formed in this manner. In other words, according to conventional technology, two adhesion steps are needed in order to form the ink passage unit.

An inkjet head will be completed by attaching actuator units onto the ink passage unit.

BRIEF SUMMARY OF THE INVENTION

In the conventional method of manufacturing an inkjet head, two adhesion steps were needed in order to form the ink passage unit. There will be a case in which the adhesive used in the first adhesion step will spread beyond the adhesion surface. There will be a case in which the adhesive that has spread beyond the adhesion surface in the first adhesion step will stick to the adhesion surface for the second adhesion step. A part of the adhesive will stick to the adhesion surface for the second adhesion step, prior to the second adhesion step. When the second adhesion step is performed in this case, the thickness of the adhesion layer on the adhesion surface in the second adhesion step may not be uniform. In order to prevent the thickness of the adhesive layer from becoming non-uniform, a large quantity of adhesive must be applied to the adhesion surface during the second adhesion step.

When a large quantity of adhesive is used, manufacturing costs will increase. In addition, manufacturing costs will increase due to the need for two adhesion steps.

Furthermore, the individual ink passages pass through the laminated plates in the plate-laminated-direction. In the conventional method of manufacturing an inkjet head, communication holes are formed in each plate, and the plates are then laminated together. By laminating the plates together, the communication holes formed in each plate will communicate with each other to form individual ink passages. When the plates in which the communication holes were formed are laminated together, the communication holes in adjacent plates may not be correctly positioned. There is a possibility that unintended stepped portions will be formed inside the individual ink passage at the contact surfaces of adjacent plates. When unintended stepped portions are produced inside the individual ink passages, the ink will not flow smoothly.

An object of the present invention is to provide a method of manufacturing an inkjet head that can reduce manufacturing costs. According to the present invention, the ink passage unit including the nozzles is formed by single adhering step. Only single adhering step is needed, the quantity of adhesive used will be reduced, and the manufacturing process of the inkjet head can be simplified. Therefore, manufacturing costs for an inkjet head can be reduced.

In particular, a method of manufacturing an inkjet head will be provided that will allow the plates to be accurately laminated together, so that the communication holes formed in each plate will be relatively accurately positioned in the plate-laminating-direction.

Furthermore, a method of manufacturing an inkjet head will be provided in which, after the plates are laminated together, one can easily inspect or confirm whether or not the communication holes formed in each plate are relatively precisely positioned in the plate-laminated-direction each other.

An inkjet head has plates, an individual ink passage and a nozzle. The plates are laminated. The individual ink passage penetrates the laminated plates. The nozzle is positioned at one end of the individual ink passage in an outermost plate of the plates.

A method of manufacturing the inkjet head according to this invention has a step of forming a communication hole in each of the plates, a step of laminating the plates with thermosetting adhesive therebetween, and a step of adhering the laminated plates.

In the step of laminating the plates, the plates are laminated so that the communication holes are overlapped with each other in a plate-laminating-direction. Thereby, the communication holes form the individual ink passage and the nozzle.

In the step of adhering the laminated plates, the laminated plates are adhered together by applying pressure to the laminated plates in the plate-laminating-direction while heating the laminated plates.

The laminated plates constitute the ink passage unit.

The laminated plates are preferably heated to a temperature equal to or greater than the cure temperature of the thermosetting adhesive.

The number of communication holes formed in each plate is not limited to one. A plurality of communication holes may be formed in each plate. In this case, a group of communication holes that are stacked together in the plate-laminating-direction will form a corresponding one set of single individual ink passage and single nozzle.

According to the aforementioned method of manufacturing an inkjet head, all plates that constitute the ink passage unit including the nozzle plate can be adhered in one adhesion step. The quantity of adhesive used will be reduced, and the manufacturing process of the inkjet head can be simplified. Therefore, manufacturing costs for the inkjet head can be reduced.

In addition, according to the aforementioned method of manufacturing an inkjet head, the plates will be laminated together so that the communication holes are stacked together in the plate-laminating-direction. The relative positions of the communication holes that form the individual ink passage will be more precise. The possibility of forming unintended stepped portions inside the individual ink passage can be reduced.

It is preferred that the manufacturing method also has a step of forming a first positioning hole in each of the plates. The first positioning hole forming step is performed before the plate laminating step.

In the plate laminating step, the plates are laminated by passing a first guide pin through each of the first positioning holes so that the communication holes are overlapped with each other in the plate-laminating-direction.

According to the aforementioned method of manufacturing an inkjet head, a plurality of plates will be positioned and laminated together so that the communication holes are stacked together precisely overlapped in the plate-laminating-direction. This is because the plates are laminated together by passing the first guide pin through each of the first positioning holes formed in the plates.

It is preferred that the manufacturing method also has a step of forming a check hole in each of the plates and a step of checking alignment of centers of the check holes in the plate-laminating-direction.

The check bole forming step is performed before the plate laminating step. Each of the check holes is formed so that the centers of the check holes are aligned in-line in the plate-laminating-direction when the plates are laminated in a predetermined relative position.

The predetermined relative position means the relative position of the plates when the plates are laminated so that the communication holes are overlapped each other in the plate-laminating-direction as designed.

According to the aforementioned method of manufacturing an inkjet head, the relative positions of the check holes stacked in the plate-laminating-direction are confirmed when the plates are laminated together. If there is no misalignment in the positions of the check holes, it can be confirmed that the plates are accurately laminated in a predetermined relative position. By forming the check holes, it can be easily confirmed whether or not the plates are accurately arranged in a predetermined relative position in the plate-laminating-direction.

BRIEF DESCRIPTION OF THE DRAWINGS

FIG. 6(*b*) is a plan view of an individual electrode shown in FIG. 6(*a*).

FIG. 10(*b*) describes a step for forming a communication hole in a plate (2).

FIG. 17(*b*) shows a check hole of the head main body completed by means of the step described in FIG. 16, viewed from the plate-laminating-direction (2).

DETAILED DESCRIPTION OF THE INVENTION

Figure 1:
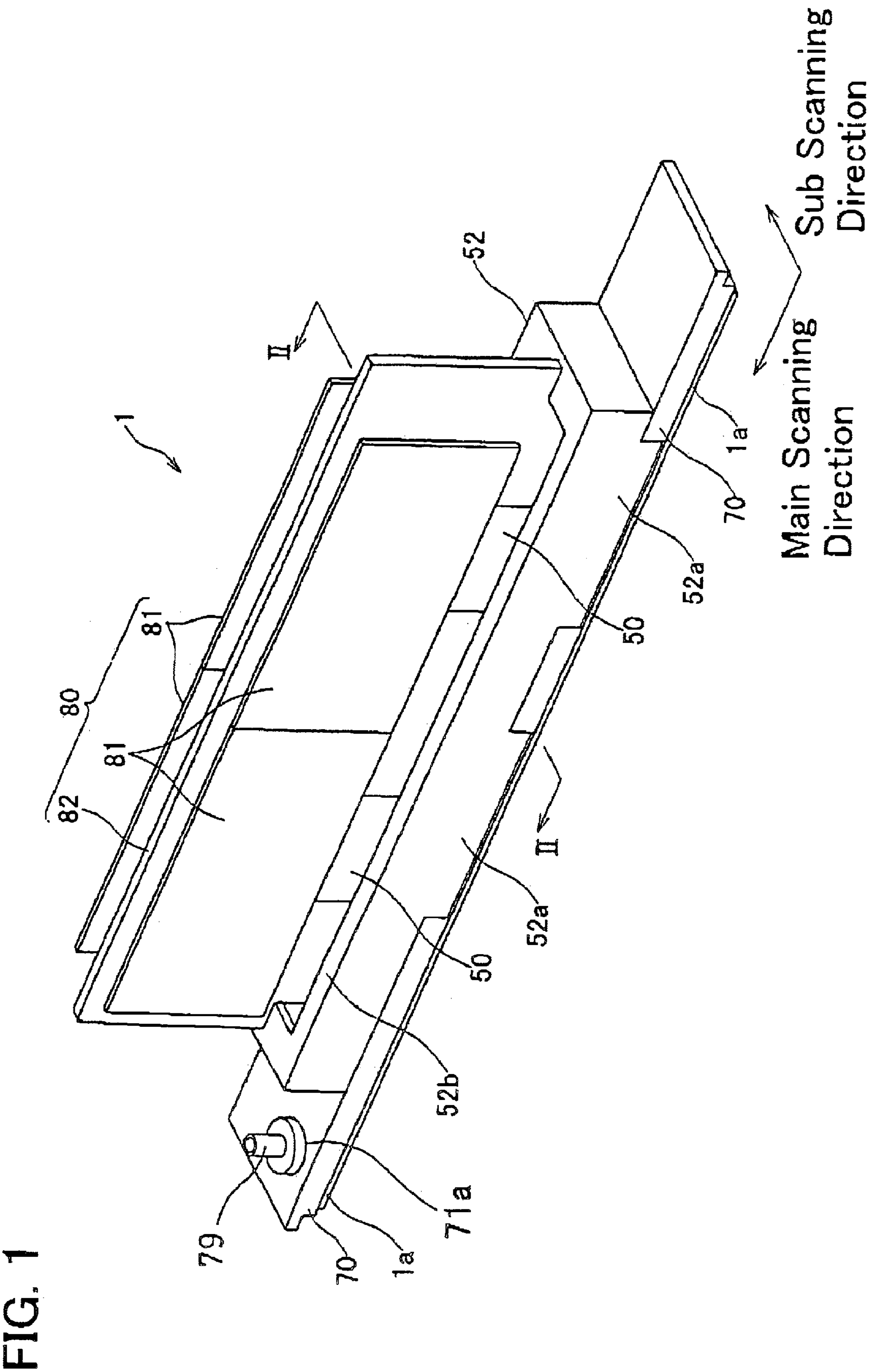
FIG. 1 is an oblique external view of an inkjet head manufactured by means of a method of manufacturing an inkjet head according to an embodiment.

Preferable technical features of the invention are described below.

The inkjet head may have an actuator unit. It is preferred that the manufacturing method also has a step of laminating the actuator units with thermosetting adhesive onto the laminated plates. The actuator unit may be laminated so as to cover the communication hole formed in one of the plates that faces the actuator unit. The actuator unit laminating step is performed before the adhering step.

In the adhering step, the actuator unit and the laminated plates may be adhered simultaneously by applying pressure to the actuator unit and the laminated plates in the plate-laminating-direction while heating the actuator unit and the laminated plates.

Due to the aforementioned technical features, an inkjet head can be manufactured at an even lower cost by simultaneously adhering the laminated plates together with the actuator unit.

The actuator unit in the inkjet head may have a piezoelectric film, individual electrodes, and a common electrode. The piezoelectric film is sandwiched by the individual electrodes and the common electrode. The inkjet head may have a plurality of the individual ink passages and the nozzles.

It is preferred, in the communication hole forming step, that the plurality of the communication holes is formed in each of the plates. Each group of the communication holes overlapped in the plate-laminating-direction forms a corresponding one set of the individual ink passage and the nozzle.

It is preferred, in the actuator unit laminating step, the actuator unit is laminated onto the laminated plates. The actuator unit may be laminated so that each of the individual electrodes is disposed at substantially same position, in the plate-laminated-direction to the corresponding one of the communication holes formed in the one of the plates that faces the actuator unit. The actuator unit may also be laminated so that the common electrode is disposed so as to cover at least two of the communication holes formed in the one of the plates that faces the actuator unit. The actuator unit may also be laminated so that the individual electrodes are positioned farther than the common electrode from the laminated plates.

Due to the aforementioned technical features, a common electrode having a surface area wider than the surface area of the individual electrodes is arranged between the laminated plates and the piezoelectric film. The surface of the actuator unit on the side facing the laminated plates can be flattened. This makes it easier to laminate the actuator unit to the laminated plates.

It is preferred, in the adhering step, that pressure is applied respectively on both an actuator-laminated-region of the laminated plates and an actuator-not-laminated-region of the laminated plates. The actuator-laminated-region is a region on which the actuator unit is laminated. The actuator-not-laminated-region is a region on which the actuator unit is not laminated.

Due to the aforementioned technical features, pressure can be separately applied on both the actuator-laminated-region and the actuator-not-laminated-region. Pressure can be separately applied in accordance with each respective region.

It is preferred that substantially the same pressure is applied on both the actuator-laminated-region and the actuator-not-laminated-region.

Due to the aforementioned technical features, at both the actuator-laminated-region and the actuator-not-laminated-region, the laminated plates can be uniformly adhered together.

It is preferred that the manufacturing method also has a step of laminating a filter with thermosetting adhesive onto the laminated plates. The filter may be laminated in order to remove dirt from the ink flowing into the individual ink passage. The filter laminating step may be performed before the adhering step.

In the adhering step, the filter and the laminated plates may be adhered simultaneously by applying pressure to the filter and the laminated plates in the plate-laminating-direction while heating the filter and the laminated plates.

Due to the aforementioned technical features, a filter for removing dirt contained in the ink that flows into the individual ink passage can be adhered to the laminated plates. The inkjet head can be manufactured at an even lower cost.

It is preferred that the manufacturing method also has a step of heating the laminated plates without applying pressure. The heating step may be performed after the plate laminating step but before the adhering step.

When the laminated plates are heated while pressure is applied thereto, the laminated plates will thermally expand during the application of pressure. In the case that the laminated plates include plates having different thermal expansion coefficient, the plates may slip each other at adhering surface during applying pressure. When the slip occurs during applying pressure, the plates pay be adhered not being uniform.

According to the aforementioned technical features, by applying heat to the laminated plates prior to the application of pressure, in the adhering step, the laminated plates can be adhered together with applying pressure in the condition in which all of the plates had thermally expanded. The slip does not occur during applying pressure thereto. The laminated plates can be adhered more uniformly.

The inkjet head may also has an ink supplying unit that supplies ink to the individual ink passage. The ink supplying unit may have a hole.

It is preferred that the manufacturing method also has a step of forming a second positioning hole in at least one of the plates that faces the ink supplying unit, and a step of attaching the ink supplying unit to the laminated plates.

The ink supplying unit may be attached to the laminated plates while positioning the ink supplying unit to the laminated plates by passing a second guide pin through the second positioning hole and the hole of the ink supplying unit.

Due to the aforementioned technical features, the ink supply unit can be attached to the ink passage unit with good precision.

When the manufacturing method of the inkjet head has a step of forming a check hole in each of the plates, it is preferred that the check holes are formed geometrically similar and are formed so that the size of area of each check holes becomes larger as the plate positioned further from the plate positioned at one side of the laminated plates.

Due to the aforementioned technical features, the contours of all check holes aligned in-line can be observed when the check holes are viewed from the plate-laminating-direction after the plates have been laminated. Thus, the relative positions of the check holes of all of the plates can be simultaneously observed. It can be easily confirmed whether or not the plates are accurately arranged in a predetermined relative position in the plate laminating direction.

It is preferred that the first positioning hole, the second positioning hole, and the check hole formed in each of the plates are formed as different holes.

Due to the aforementioned technical features, each respective hole can be formed in the shapes and sizes suitable for each respective step. Positioning and inspection can be performed with greater precision.

Preferred embodiments of the present invention will be described with reference to the attached drawings.

<Overall Structure of Inkjet Head>

Figure 2:
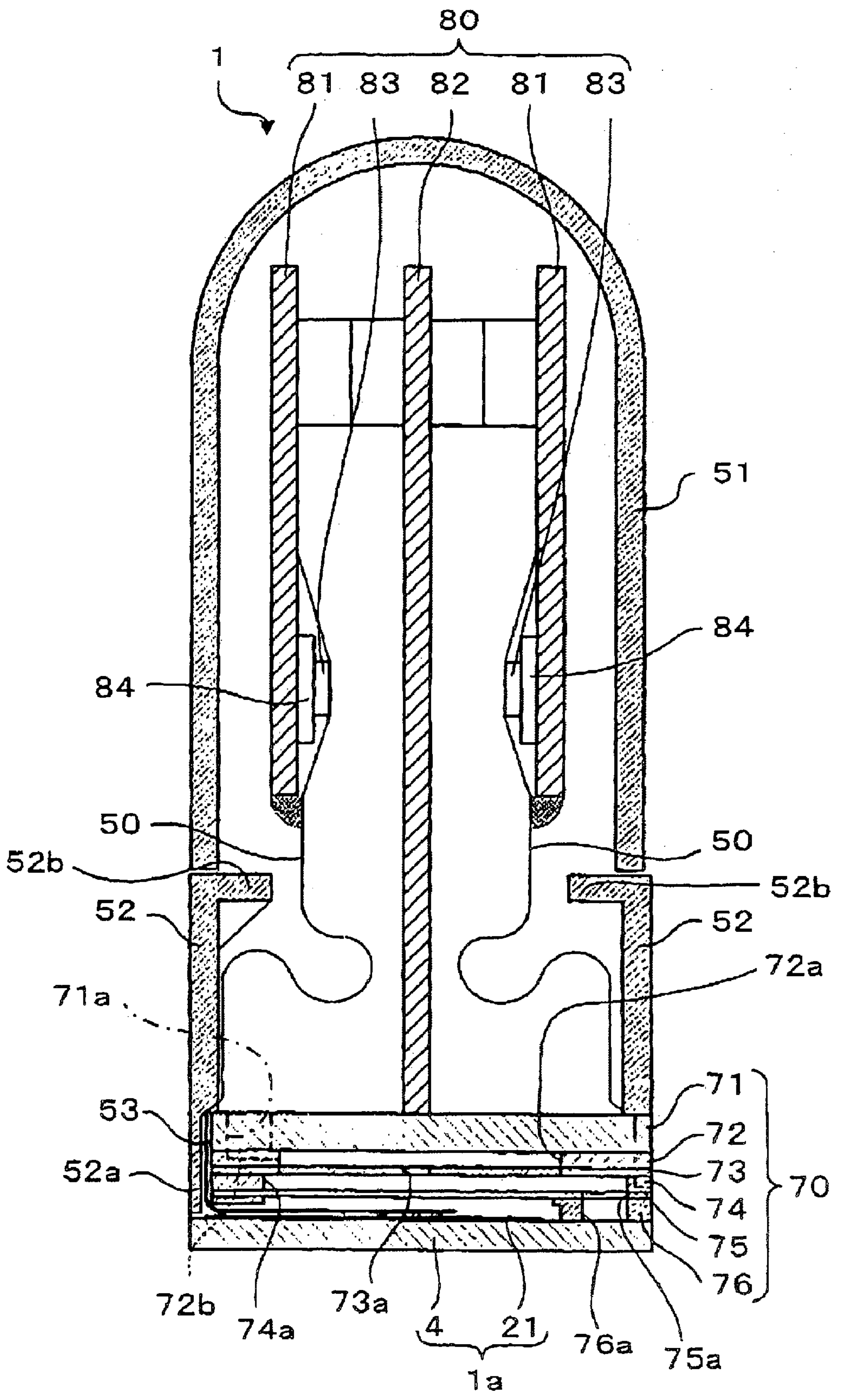
FIG. 2 is a cross-sectional view corresponding to line II-II shown in FIG. 1.

FIG. 1 shows an external view of an inkjet head that is manufactured by means of a manufacturing method of the present embodiment. FIG. 2 is a cross-sectional view corresponding to line II-II shown in FIG. 1.

As shown in FIG. 1, inkjet head 1 has a planar shape that is substantially rectangular. The longitudinal direction of the rectangular shape will be referred to as the main scanning direction, and the shortened direction will be referred to as the sub scanning direction.

The inkjet head 1 has a head main body 1*a*, a reservoir unit 70 (ink supply unit), and a controller 80 that controls the head main body 1*a*. These will be described below with reference to FIGS. 1 and 2.

The controller 80 has a main circuit plate 82, sub circuit plates 81, and driver ICs 83. The sub circuit plates 81 are arranged on the lateral surfaces of the main circuit plate 82. The driver ICs 83 are fixed to the lateral surfaces of the sub circuit plates 81 via heat sinks 84. These lateral surfaces are surfaces that face the main circuit plate 82. The driver ICs 83 generate signals for driving actuator units 21 that are included in the head main body 1*a*.

The main circuit plate 82 and the sub circuit plates 81 have rectangular shapes that extend in the main scanning direction. The main circuit plate 82 and the sub circuit plates 81 are arranged on the inkjet head 1 so as to be mutually parallel. The main circuit plate 82 is fixed to the upper surface of the reservoir unit 70. The sub circuit plates 81 are arranged on both sides of the main circuit plate 82 in the sub scanning direction. The distance from each respective sub-board 81 to the main circuit plate 82 is equal. The sub-board 81 is arranged above the reservoir unit 70. There is a predetermined distance between the sub-board 81 and the reservoir unit 70. The main circuit plate 82 and each sub-board 81 are electrically connected to each other.

The inkjet head 1 has FPCs (Flexible Printed Circuits) 50 which transmit electrical signals. One end of each FPC 50 is electrically connected to the actuator units 21 that are disposed at lower part of the inkjet head 1. The other end of each FPC 50 extends upward from lower part of the inkjet head 1. The other ends of the FPCs 50 are electrically connected to the sub circuit plates 81. The FPCs 50 are electrically connected to the driver IC in between the actuator units 21 and the sub circuit plates 81. In this way, the FPCs 50 can transmit signals output from the sub circuit plates 81 to the driver ICs 83, and can transmit drive signals output from the driver IC 83 to the actuator units 21.

The inkjet head 1 has an upper cover 51 that covers the controller 80, and a lower cover 52 that covers the lower part of the inkjet head 1. These covers prevent ink that has sprayed during printing from adhering to the controller 80 and the like. Note that in FIG. 1, the upper cover 51 is omitted so that the structure of the control unit 80 can be easily seen.

As shown in FIG. 2, the upper cover 51 has an arch-shaped ceiling, and covers the control unit 80. The lower cover 52 has a square tubular shape that is open at the top and bottom thereof. The lower cover 52 covers the lower portion of the main circuit plate 82. Upper walls 52*b* that project inward are formed on the upper ends of the side walls of the lower cover 52. The lower end of the upper cover 51 is arranged on the upper surface of the connection point between the upper walls 52*b* and the lateral walls of the lower cover 52. The lower cover 52 and the upper cover 51 have the same width as the head main body 1*a*.

Projections 52*a* that projects downward are formed on the lower end of both lateral walls of the lower cover 52. Two projections 52*a* are arranged along the main scanning direction. A state is shown in FIG. 1 in which a projection 52*a* is formed on one lateral wall. Although not shown in the drawings, two projections 52*a* are formed on the other lateral wall. The projections 52*a* are supported by recesses 53 in the reservoir unit 70 (described below). In addition, the projections 52*a* cover the FPCs 50 that extend from the lower portion of the reservoir unit 70 to the recesses 53. The tips of the projections 52*a* face a passage unit 4. A predetermined gap is arranged between the tips of the projections 52*a* and the passage unit 4 (ink passage unit). This gap is arranged in order to accommodate manufacturing errors that are produced between the passage unit 4 that is included in the head main body 1*a*. The gap between the projections 52*a* and the passage unit 4 is sealed by filling the same with a silicone resin or the like. The lower ends of the lateral walls of the lower cover 52 are arranged on the upper surface of the reservoir unit 70, on the portions thereof in which the projections 52*a* of the lower ends of the lateral walls are not formed.

The vicinity of the ends of the FPCs 50 that are connected to the actuator units 21 extend horizontally along the upper surface of the passage unit 4. Then, the FPCs 50 pass through the interiors of the recesses 53 arranged in the reservoir unit 70, and then curve while extending upward.

As shown in FIG. 2, the reservoir unit 70 is arranged on the upper portion of the head main body 1*a*. The reservoir unit 70 extends in the main scanning direction (see FIG. 1). The reservoir unit 70, as noted above, has recesses 53 that are formed in a shape that conform with the projections 52*a* of the lower cover 52. The reservoir unit 70 has a laminated structure in which six plates 71, 72, 73, 74, 75 and 76 having rectangular shapes elongated in the main scanning direction arc laminated together. The plates 71-76 of the reservoir unit 70 respectively have a penetration hole 71*a*, an ink storage 72*a*, a groove 72*b*, a penetration hole 73*a*, an ink storage 74*a*, penetration holes 75*a*, and penetration holes 76*a* formed therein.

As shown in FIG. 1, the penetration hole 71*a* is formed in the vicinity of one end of the plate 71 in the main scanning direction, and in the vicinity of one end in the sub scanning direction. An ink supply port 79 is arranged in the upper portion of the penetration hole 71*a*. The ink supply port 79 is connected to an ink tank not shown in the drawings.

Ten penetration holes 76*a* are formed in the plate 76. Each respective penetration hole 76*a* communicates via an opening 3*a* with manifold passages (common ink chambers) 5 described below that are arranged in the passage unit 4. The manifold passages 5 and the openings 3*a* will be described with reference to FIG. 3.

Ten penetration holes 75*a* are formed in the plate 75. Each respective penetration hole 75*a* is disposed in a position that faces the corresponding penetration hole 76*a*.

The penetration hole 73*a* is in the approximate central portion of the plate 73, and is formed inside the region that faces both ink storages 72*a* and 74*a*.

The ink storage 72*a* is formed in the plate 72. The ink storage 72*a* extends in the main scanning direction.

The ink storage 74*a* is formed in the plate 74. The ink storage 74*a* extends in the main scanning direction.

The groove 72*b* is formed in the plate 72. The groove 72*b* is disposed in a position that faces the penetration hole 71*a*. One end of the groove 72*b* communicates with the ink storage 72*a*.

The plates 71-16 are laminated so that the penetration hole 71*a* communicates with the penetration hole 76*a* via the groove 72*b*, ink storage 72*a*, penetration hole 73*a*, ink storage 74*a*, and penetration hole 75*a*.

Thus, an ink passage that communicates from the penetration hole 71*a* to the penetration hole 76*a* will be formed inside the reservoir unit 70. Then, the ink inside the ink tank connected with the penetration hole 71*a* will be supplied to the manifold passages 5 of the passage unit 4 via this ink passage.

<Head Main Body>

Figure 3:
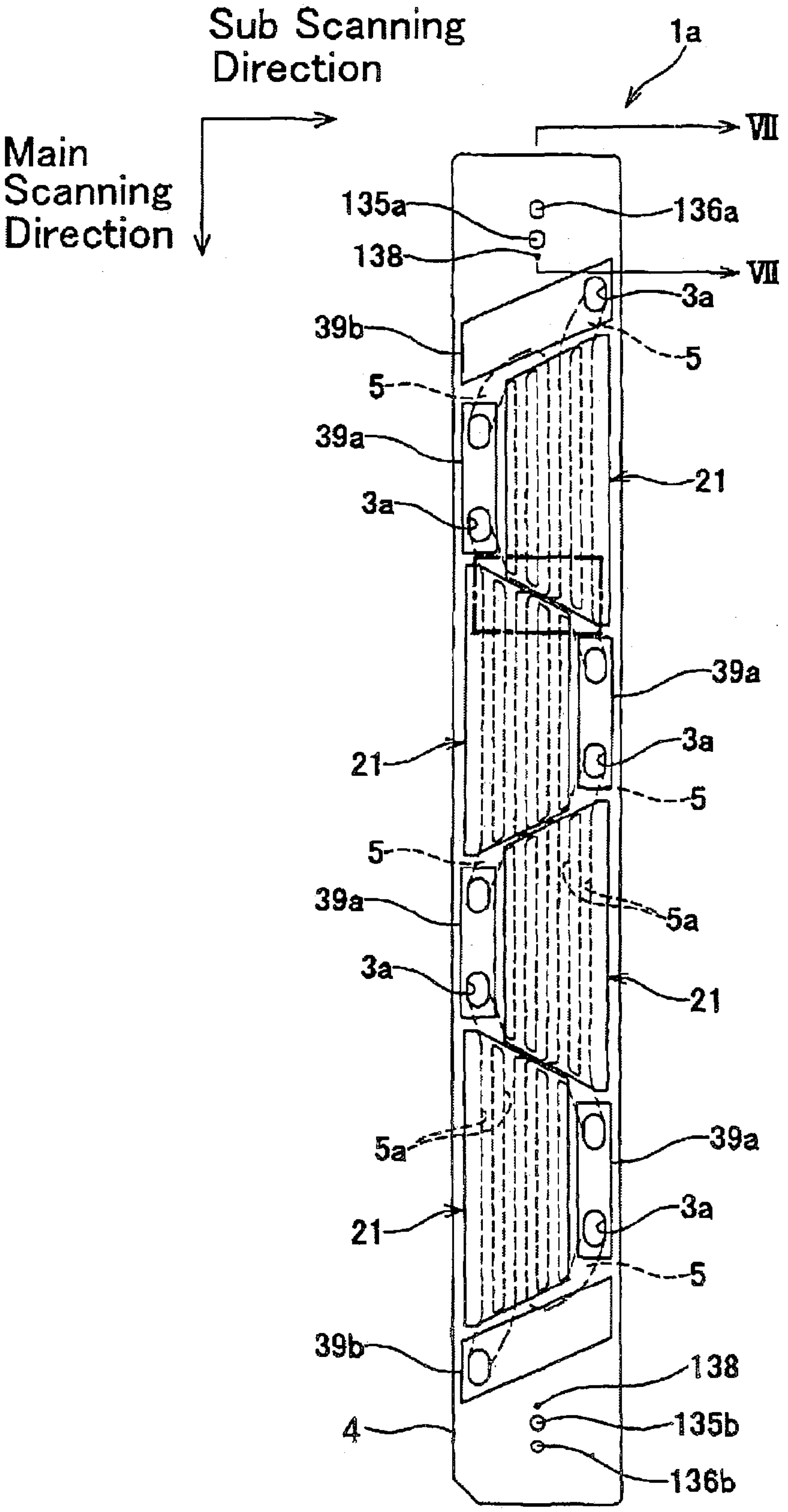
FIG. 3 is a plan view of a head main body shown in FIG. 1.
Figure 4:
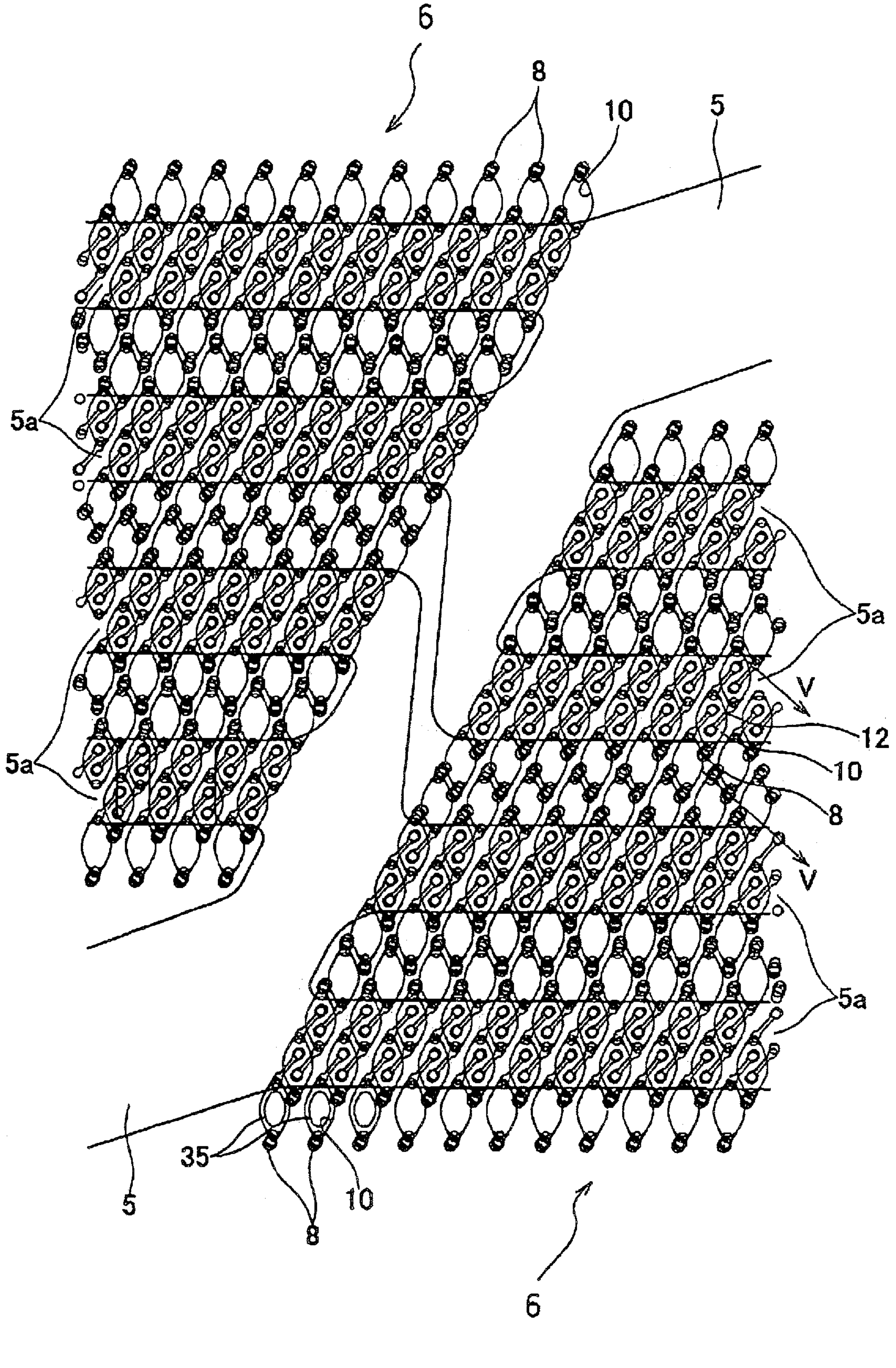
FIG. 4 is an enlarged view of the region that is surrounded with bold dotted lines in FIG. 3.

The head main body 1*a* will be described below with reference to the drawings. FIG. 3 is a plan view of the head main body 1*a*. FIG. 4 is an enlarged view of the region that is surrounded with bold dotted lines in FIG. 3. Note that in FIG. 3 and FIG. 4, the direction toward the drawings is the upward direction of the inkjet head 1, i.e., the direction toward the reservoir unit 70.

As shown in FIGS. 2 and 3, the head main body 1*a* has a passage unit 4 and actuator units 21.

The passage unit 4 has a planar, rectangular shape elongated in the main scanning direction. The actuator units 21 are adhered to the upper surface of the passage unit 4.

As shown in FIG. 3, four actuator units 21 are arranged on the upper surface of the passage unit 4. The actuator units 21 have trapezoid shapes in the plan view shown in FIG. 3. The actuator units 21 are arranged so that a pair of parallel facing sides of the trapezoids is parallel in the main scanning direction. The adjacent actuator units 21 are arranged so that the orientation of the trapezoids alternate in the sub scanning direction. The adjacent actuator units 21 are arranged to be relatively offset in the sub scanning direction. In the plan view shown in FIG. 3, the diagonal sides of adjacent actuator units 21 partially overlap in the sub scanning direction.

<Passage Unit>

The manifold passages 5 that are one portion of the ink passage are formed in the interior of the passage unit 4. The openings 3*a* of the manifold passages 5 are formed in the upper surface of the passage unit 4. Five openings 3*a* are arranged along one side of the passage unit that extends in the main scanning direction. Other five openings 3*a* are arranged along the other side of the passage unit that extends in the main scanning direction. Note that in FIG. 3, some of the openings are not labeled with reference numeral 3*a*.

The openings 3*a* are formed in positions that avoid the regions in which the four actuator units 21 are formed. Furthermore, as noted above, the openings 3*a* are disposed in positions that communicate with the penetration holes 76*a* of the reservoir unit 70.

Filters 39 (39*a*, 39*b*) are adhered to the upper surface of the passage unit 4 in positions that cover the openings 3*a*. The filters 39 serve to remove dirt and the like in the ink that is supplied from the reservoir unit 70 to the passage unit 4 via the openings 3*a*. The filters 39 adhered to the passage unit 4 include four rectangular filters 39*a*, and two parallelogram shaped filters 39*b*.

The four rectangular filters 39*a* are respectively adhered to regions that are interposed between the parallel facing ends in the short direction of the actuator units 21 that are trapezoidal in shape, and the lateral ends of the passage unit 4. These filters 39*a* are arranged so that each filter 39*a* covers the two respective openings 3*a* that are formed in these regions. The parallelogram shaped filters 39*b* are adhered adjacent to the actuator units 21 that are positions on both ends in the main scanning direction of the passage unit 4. Then, these filters 39*b* are arranged so that they respectively cover the openings 3*a* that are formed in positions that are adjacent to both ends of the passage unit 4.

Four sub-manifold passages 5*a* branch from the manifold passages 5 that are formed inside the passage unit 4. Note that in FIG. 3, reference numerals "5*a*" for sub-manifold passages 5*a* have been omitted for some of the sub-manifold passages. These sub-manifold passages 5*a* extend so as to be mutually adjacent to each other on the lower side of each actuator unit 21 (the interior of the passage unit 4).

Positioning holes 135*a*, 135*b*, 136*a*, and 136*b* described below are formed in the interior of the passage unit 4. Openings of the positioning holes 135*a*, 135*b*, 136*a*, and 136*b* are formed in the upper surface of the passage unit 4.

Two check holes 138 described below are formed in the interior of the passage unit 4. The openings 3*a* of the check holes 138 are formed in the upper surface of the passage unit 4.

FIG. 4 is an expanded view of the region that is surrounded with the bold dotted line in FIG. 3. Note that the actuator units 21, are omitted in FIG. 4 in order to simplify the description. In other words, FIG. 4 is a plan view of the head main body 1*a* in a state in which the actuator units 21 are not arranged on the upper surface of the passage unit 4. In addition, in order to make it easier to view FIG. 4, pressure chambers 10, apertures 12, and other items formed in the interior of the passage unit 4, are illustrated with solid lines although they should actually be shown with broken lines.

As shown in FIG. 4, the passage unit 4 has groups of pressure chambers 6 in which a plurality of pressure chambers 10 are, formed in a lattice shape. As described below, the pressure chambers 10 are formed so as to open on the upper surface of a cavity plate 22 (see FIG. 5) that constitutes the outermost plate on one end of the passage unit 4. The pressure chambers 10 that are formed in the pressure chamber groups 6 are aligned along substantially the entire surface of the regions that face the actuator units 21. In other words, the pressure chamber groups 6 have sizes and shapes that are substantially the same as the actuator units 21. Like with the actuator units 21, adjacent pressure chamber groups 6 are arranged to be relatively offset in the sub scanning direction. Note that in FIG. 4, only a portion of the pressure chamber groups 6 are illustrated.

Figure 6:
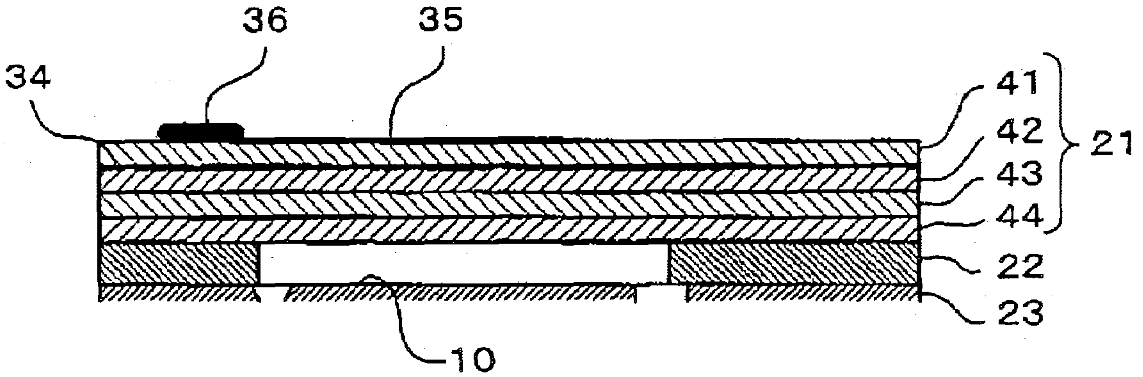
FIG. 6(*a*) is an enlarged cross-sectional view of an actuator unit shown in FIG. 5.
Figure 6:
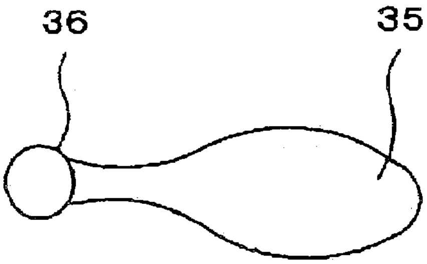

Individual electrodes 35 are arranged on the actuator units 21 in the regions that face each pressure chamber 10 (see FIG. 6). As shown in FIG. 4, the individual electrodes 35 have planar shapes that are slightly smaller than the planar shapes of each pressure chamber 10. Each individual electrode 35 is arranged on the actuator units 21 in the approximate center of the regions that face the pressure chambers 10. Each individual electrode 35 is entirely accommodated inside the regions that face the pressure chambers 10.

A large number of nozzles 8 are formed in the passage unit 4. These nozzles 8 are arranged on the lower surface of the passage unit 4 in positions that avoid the regions that face the sub-manifold passages 5*a*. In addition, the nozzles 8 are formed in a nozzle plate 31 (see FIG. 5) that constitutes the outermost plate on the other side of the passage unit 4, i.e., the outermost plate on the opposite side of the cavity plate 22. The nozzles 8 are arranged inside the regions that face the pressure chamber groups 6. As shown in FIG. 4, the nozzles 8 inside each respective region that faces the pressure chamber groups 6 are aligned in intervals along parallel straight lines in the lengthwise direction (the main scanning direction) of the passage unit 4. The alignment intervals of the nozzle 8 on the straight lines are referred to as alignment interval-A. Note that in FIG. 3, reference numerals "8" for the nozzle 8 have been omitted for some of the nozzles.

Imaginary parallel straight line that extends in the lengthwise direction (main scanning direction) of the passage unit 4 is assumed. Each nozzle 8 formed in the passage unit 4 is aligned such that each reflection point that reflects the position of each nozzle 8 on the imaginary straight line is lined up on the imaginary straight line at equal intervals. The alignment interval of each of these reflection points is smaller than the alignment interval-A. Here, the reflection point means a point of intersection of two lines. One line is the imaginary straight line. The other line is the lines parallel to the short direction of the passage unit 4 (the sub scanning direction) and, pass the positions of each nozzle 8.

A large number of apertures (chokes) 12 are formed in the interior of the passage unit 4. The apertures 12 are formed in an aperture plate 24 (see FIG. 5) that is positioned between the nozzle plate 31 and the cavity plate 22. In addition, the apertures 12 are arranged inside the regions that face the pressure chamber groups 6. The apertures 12 of the present embodiment extend along a predetermined direction that is parallel with the horizontal surface.

<Individual Ink Passages>

A large number of individual ink passages 32 that link the sub-manifold passages 5*a* and the nozzles 8 are formed in the passage unit 4. The individual ink passages 32 are described in FIG. 5.

Figure 5:
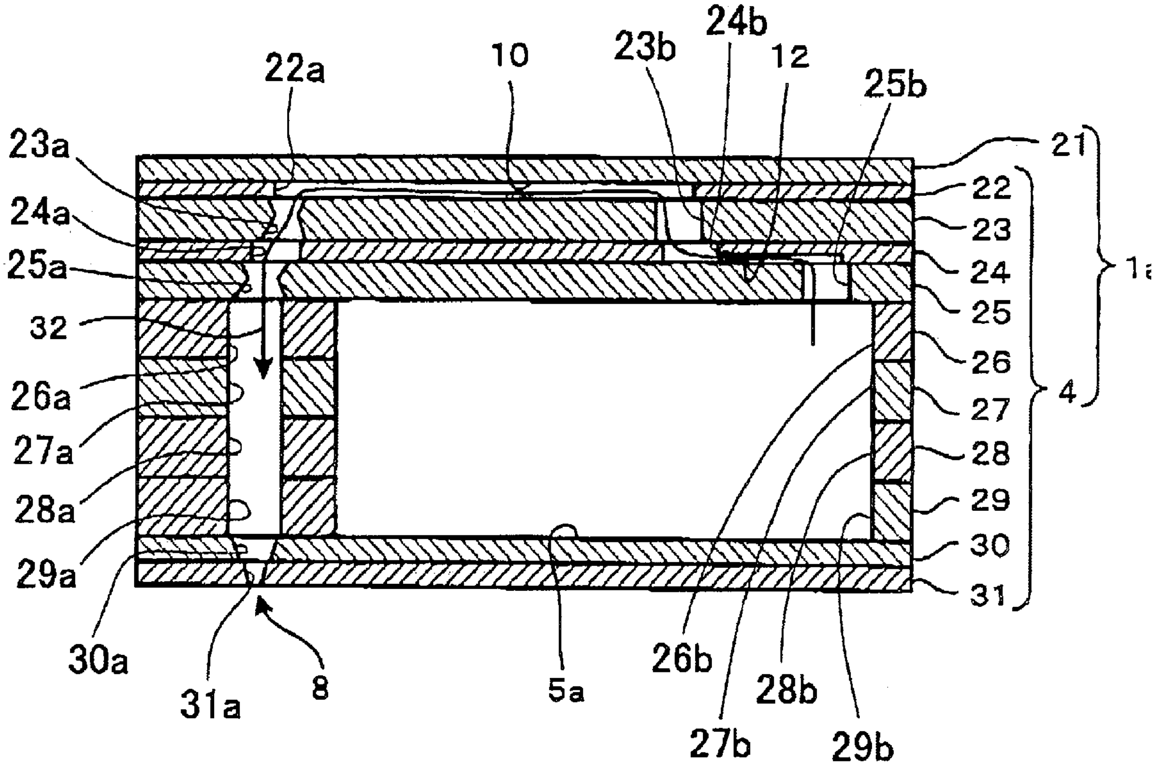
FIG. 5 is a cross-sectional view that corresponds to line V-V shown in FIG. 4.

FIG. 5 is a cross-sectional view corresponding to line V-V of FIG. 4 in the head main body 1*a*.

The head main body 1*a* has the passage unit 4, and the actuator units 21 adhered to the upper surface thereof. As shown in FIG. 5, the passage unit 4 is composed of a laminated unit in which a plurality of plates is laminated together. There are 10 of these plates in the present embodiment, and include the cavity plate 22, a base plate 23, an aperture plate 24, a supply plate 25, manifold plates 26, 27, 28, 29, a cover plate 30 and the nozzle plate 31.

Communication holes that form the individual ink passages 32 by communicating with each other are formed in the aforementioned each of 10 plates.

The communication holes that constitute the sub-manifold passages 5*a* are included in these communication holes. The communication holes that constitute the sub-manifold passages 5*a* will be referred to as communication-holes-A.

The communication holes that constitute the passages that extend from one end of the pressure chambers 10 to the nozzles 8 are included in these communication holes. The communication holes that constitute the passages that extend from one end of the pressure chambers 10 to the nozzles 8 will be referred to as communication-holes-B.

The communication holes that constitute the passages that extend from the other end of the pressure chambers 10 to the sub-manifold passages 5*a* are included in these communication holes. The communication holes that constitute the passages that extend from the other end of the pressure chambers 10 to the sub-manifold passages 5*a* will be referred to as communication-holes-C.

The communication holes that are formed in each plate will be described.

Communication holes 22*a* are formed in the cavity plate 22. Communication holes 23*a* and communication holes 23*b* are formed in the base plate 23. Communication holes 24*a* and communication holes 24*b* are formed in the aperture plate 24. Communication holes 25*a* and communication holes 25*b* are formed in the supply plate 25. Communication holes 26*a* and communication holes 26*b* are formed in the manifold plate 26. Communication holes 27*a* and communication holes 27*b* are formed in the manifold plate 27. Communication holes 28*a* and communication holes 28*b* are formed in the manifold plate 28. Communication holes 29*a* and communication holes 29*b* are formed in the manifold plate 29. Communication holes 30*a* are formed in the cover plate 30. Communication holes 31*a* are formed in the nozzle plate 31.

A plurality of communication holes 22*a* are formed in the cavity plate 22 though only one communication hole 22*a* is shown in FIG. 5. Likewise, a plurality of communication holes is formed in each plate.

The communication holes 22*a* formed in the cavity plate 22 constitute the pressure chambers 10. The communication holes 24*b* formed in the aperture plate 24 constitute the apertures 12. The communication holes 31*a* formed in the nozzle plate 31 constitute the nozzles 8. The pressure chambers 10 and the apertures 12 are also a part of the individual ink passages 32.

The communication holes 26*b*, 27*b*, 28*b*, 29*b* constitute the communication-holes-A noted above. Each communication-holes-A corresponds to each sub-manifold passage 5*a*.

The communication holes 23*a*, 24*a*, 25*a*, 26*a*, 27*a*, 28*a*, 29*a*, 30*a*, 31*a* constitute the communication-holes-B noted above.

The communication holes 23*b*, 24*b*, 25*b* constitute the communication-holes-C noted above.

Each individual ink passage 32 is constituted by the corresponding communication-holes-B, corresponding communication-holes-C, corresponding communication hole 22*a* (pressure chamber 10), and corresponding communication hole 24*b* (aperture 12). Ink that flows out from each sub-manifold passage 5*a* will flow out from the corresponding nozzle 8 through the corresponding individual ink passage 32. Each of the individual ink passages 32 has the following shape. The individual ink passage 32 extends upward from the sub-manifold passage 5*a* to one end of the aperture 12. The individual ink passage 32 extends horizontally along the aperture 12 to the other end of the aperture 12. The individual ink passage 32 extends upward from the other end of the aperture 12 to one end of the pressure chamber 10. The individual ink passage 32 extends horizontally along the pressure chamber 10 to the other end of the pressure chamber 10. The individual ink passage 32 extends from the other end of the pressure chamber 10, through three plates (plates 23, 24, 25), and diagonally downward, and then continue to the nozzle 8 directly below.

Thus, Each of the individual ink passages 32 has a bow shape in which the pressure chamber 10 is the top portion thereof. In this way, as shown in FIG. 4, a high density arrangement of individual ink passages 32 can be achieved. In addition, the individual ink passages 32 achieve a smooth flow of ink.

Portion of each individual ink passage 32 that is formed by the pressure chamber 10 (communication hole 22*a*) and the communication-holes-B (the communication holes 23*a*, 24*a*, 25*a*, 26*a*, 27*a*, 28*a*, 29*a*, 30*a*, 31*a*) passes through the passage unit 4. In other words, the portion of each individual ink passage 32 that is formed by the pressure chamber 10 and the communication-holes-B penetrates the laminated plates (22-31) in the plate-laminating-direction. The pressure chamber 10 (communication hole 22*a*) is located at one outermost plate of the passage unit 4. The nozzle 8 is located at the other outermost plate of the passage unit 4.

<Positioning Holes>

As shown in FIG. 3, four positioning holes 135*a*, 135*b*, 136*a* and 136*b* are formed in the passage unit 4. In other words, the positioning holes 135*a*, 135*b*, 135*a* and 136*b* are formed in each respective plate (plates 22, 23, 24, 25, 26, 27, 28, 29, 30, 31) that forms the passage unit 4.

Figure 7:
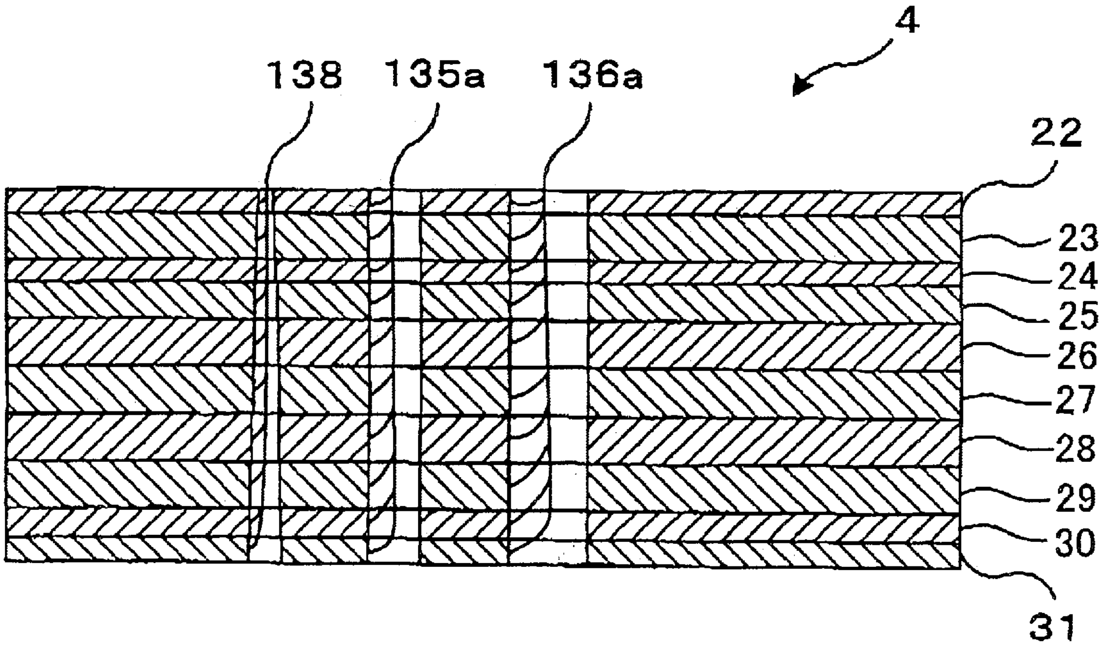
FIG. 7 is a cross-sectional view corresponding to line VII-VII shown in FIG. 3.

The positioning holes 135*a* and the positioning holes 136*a* are formed in the vicinity of one end of the passage unit 4 in the lengthwise direction (main scanning direction). The positioning holes 135*b* and the positioning holes 136*b* are formed in the vicinity of the other end of the passage unit 4. These four positioning holes 135*a*, 135*b*, 136*a*, 136*b* are arranged near the center of the passage unit 4 in the short direction (the sub scanning direction). In addition, the positioning holes 135*a*, 135*b*, 136*a*, 136*b* are arranged in parallel straight lines in the lengthwise direction of the passage unit 4 (the main scanning direction). The positioning holes 136*a* and 136*b* are respectively arranged on the outer sides of the positioning holes 135*a* and 135*b* in the main scanning direction of the passage unit 4. As shown in FIG. 7, the positioning holes 135*a*, 135*b*, 136*a*, 136*b* are formed in each of the plates that constitute the passage unit 4.

The positioning holes 135*a*, formed in each respective plate, have a cross-sectional shape that is substantially round. As shown in FIG. 7, the positioning holes 135*a* formed in each plate have a cross-sectional shape that is the same size in each plate that constitutes the passage unit 4. As shown in FIG. 7, the positioning holes 135*a* that are formed in each respective plate are arranged so as to mutually overlap in the plate-laminating-direction when the plates are laminated in predetermined relative positions. Although not illustrated in FIG. 7, the positioning holes 135*b* have the same shape as the positioning holes 135*a*.

The positioning holes 136*a* formed in each respective plate have a cross-sectional shape that is substantially round. As shown in FIG. 7, the positioning holes 136*a* have a cross-sectional shape that is the same size in each plate that constitutes the passage unit 4. As shown in FIG. 7, the positioning holes 136*a* that are formed in each respective plate are arranged so as to mutually overlap in the plate laminating direction when the plates are laminated in predetermined relative positions. Although not illustrated in FIG. 7, the positioning holes 136*b* have the same shape as the positioning holes 136*a*.

On the other hand, the shape of each positioning hole 136*a* formed in corresponding plate is mutually different. The shape of each positioning hole 136*b* is formed in the same manner as positioning hole 136*a*.

As described below, the positioning holes 135*a*, 135*b* are used for positioning when each plate is to be laminated. There will be times below in which the positioning holes 135*a*, 135*b* are referred to as first positioning holes.

As noted below, the positioning holes 136*a*, 136*b* are used for positioning when the reservoir unit 70 is to be attached to the passage unit 4. There will be times below in which the positioning holes 136*a*, 136*b* are referred to as second positioning holes.

Note that the positioning holes 135*a* and 136*a* may be the same shape. The positioning holes 135*a* and 136*b* may also be the same shape. The positioning holes 135*b* and 136*b* may also be the same shape. The positioning holes 135*b* and 136*b* may also be the same shape. Furthermore, the positioning holes 135*a*, 135*b*, 136*a*, 136*b* may all be different shapes, or may all be the same shape. Moreover, the shapes of the positioning holes 135*a*, 135*b*, 136*a*, and 136*b* in the plate laminating direction need not be circular.

<Check Holes>

As shown in FIG. 3, two check holes 138 are formed in the passage unit 4. The check holes 138 are formed in the vicinity of both ends of the passage unit 4 in the main scanning direction. The check holes 138 are formed in the vicinity of the center of the passage unit 4 in the sub scanning direction. The respective check holes 138 are arranged closer the center of the passage unit 4 in the main scanning direction than the positioning holes 135*a* and 135*b*.

As shown in FIG. 7, the check holes 138 pass from the cavity plate 22 of the uppermost plate to the nozzle plate 31 of the lowermost plate that are included in the passage unit 4. In other words, the check holes 138 are formed in each respective plate (plates 22-31) that form the passage unit 4. As shown in FIG. 7, the check holes 138 that are formed in each respective plate are formed such that the centers of the check holes 138 are lined up on a straight line that extends along the plate-laminating-direction when the plates are laminated in predetermined relative positions.

The check hole 138 formed in each plate has a round planar shape. Each check hole 138 is formed in each plate so that when the aforementioned positioning holes are used to accurately laminate each plate, the center of each respective check hole 138 is positioned on a straight line that extends along the plate-laminating-direction. In other words, when each plate that forms the passage unit 4 is laminated in predetermined relative positions, each check hole 138 formed in each plate will be arranged so that the center of each check hole 138 are aligned in-line in the plate-laminating-direction.

As shown in FIG. 7, amongst the check holes 138 formed in each plate, the size of the check holes 138 formed in the cavity plate 22 that constitutes one of the outermost plates of the passage unit 4 are formed to be the smallest. The check holes 138 will increase in size the farther apart they are from the cavity plate 22. In other words, the check holes 138 are formed so that the sizes thereof become gradually smaller from the plate (nozzle plate 31) that is positioned on one side of the passage unit 4 to the plate (cavity plate 22) that is positioned on the other side of the passage unit 4.

There are a total of 10 plates that constitute the passage unit 4. Thus, the shape profile of the check hole 138 formed in each plate that is projected on a flat surface perpendicular with respect to the plate-laminating-direction, is one of 10 concentric circles having different radii. Thus, when each plate is accurately positioned in a predetermined relative position and laminated, 10 concentric circles having different radii will be observed when the check holes 138 are observed from the nozzle plate 31 side of the passage unit 4.

Note that the planar shape of the check hole 138 formed in each plate may be non-circular. However, the planar shape of the check hole 138 formed in each plate is preferably similar to each other. In this case, when each plate is accurately positioned in a predetermined relative position, the center of the surface area of each of the planar cheek holes 138 will be formed so as to be positioned on a straight line that extends in the plate-laminating-direction. In addition, the check hole 138 may be formed in each plate so that the size of the check hole 138 will become smaller the farther apart it is from the cavity plate 22.

<Actuator Units>

The actuator units 21 will be described with reference to FIG. 6. FIG. 6 (*a*) is an enlarged view of the area around the actuator unit 21 shown in FIG. 5.

As shown in FIG. 6 (*a*), the actuator unit 21 has a piezoelectric film 41, and sheets 42, 43 and 44. The piezoelectric film 41 and the sheets 42-44 are laminated via a common electrode 34. The piezoelectric film 41, the sheets 42-44, and the common electrode 34 are arranged so as to cover the plurality of pressure chambers 10 formed in the passage unit 4. A plurality of individual electrodes 35 are arranged on the upper surface of the piezoelectric film 41. However, only one individual electrode 35 is illustrated in FIG. 6 (*a*). The plurality of individual electrodes 35 are arranged in positions that face each respective pressure chamber 10.

The piezoelectric film 41 is composed of a piezoelectric material such as a lead zirconatc titanate (PZT) type ceramic material having ferroelectric characteristics. The common electrode 34 is grounded in an area that is not illustrated. Thus, the common electrode 34 maintains a uniform ground electric potential in the regions facing all pressure chambers 10.

FIG. 6 (*b*) is a plan view of an individual electrode 35. The individual electrode 35 has a main portion that is rhomboid in shape. The main portion has substantially the same shape as the pressure chamber 10. However, the planar size of the individual electrode 35 is slightly smaller than the planar size of the pressure chamber 10. Each individual electrode 35 is arranged on the piezoelectric film 41, so that the main portion thereof is positioned in the center of the region that faces the corresponding pressure chamber 10.

Each individual electrode 35 has a land 36 that extends from the main portion. The land 36 extends from one acute angled portion of the main portion of the individual electrode 35. The land 36 has a circular shape. As shown in FIG. 6(*a*), the land 36 is thicker than the main portion. In other words, the upper surface of the land 36 swells from the surface of the piezoelectric film 41.

The upper surface of the land 36 of the individual electrode 35 is electrically connected with the ends of the FPCs 50 (see FIGS. 1 and 2). In this way, the FPCs 50 will transmit signals output from the sub circuit plate 81 to the driver IC 83, and will transmit drive signals output from the driver IC 83 to each individual electrode 35.

A metal may be employed as the material of the sheets 42-44, or PZT may be employed like in the piezoelectric film 41. In addition, a piezoelectric material and the like other than PZT may also be used. For example, lead-magnesium niobate, lead-nickel niobate, lead-zinc niobate, lead-manganese niobate, lead-antimony stannate, lead titanate, and the like can be used as a material that resembles PZT. The mutual affinity of these materials is high. When these materials are used, the durability of the actuator units 21 can be increased.

<Ink Discharging>

The ink discharging operation by the actuator units 21 will be described.

As shown in FIG. 6(*a*), in the actuator unit 21, the individual electrode 35 is arranged on the layer furthest away from the pressure chamber 10. The individual electrode 35 and the common electrode 34 sandwich the piezoelectric film 41. The piezoelectric film 41 is polarized in the thickness direction. The piezoelectric film 41 is the only active layer that is included in the actuator unit 21. In other words, the actuator unit 21 is of the so-called unimorph type.

When an electrical potential is applied to the individual electrode 35, an electric field will be generated to portions of the piezoelectric film 41 that are sandwiched by the individual electrode 35 and the common electrode 34. This electric field is in a direction that is perpendicular with respect to the direction that connects the individual electrode 35 and the common electrode 34. In other words, the direction of the electric field is parallel with respect to the thickness direction of the piezoelectric film 41. The piezoelectric film 41 is polarized in the direction in which the electric field is applied. The portions of the piezoelectric film 41 to which the electric field is generated will shrink in the direction perpendicular to the aforementioned direction of polarity due to a piezoelectric effect.

At this time, the sheets 42-44 will not be affected by the generated electric field, and will not actively shrink. Thus, due to the shrinkage of the piezoelectric film 41, strain will be produced between the piezoelectric film 41 and the sheets 42-44. Due to this strain, the sheets 42-44 will deform so as to produce a convex portion on the side opposite the piezoelectric film 41, i.e., the lower surface side of the actuator unit 21.

On the other hand, as shown in FIG. 6, the pressure chamber 10 is arranged on the upper surface of the passage unit 4, in the regions facing the individual electrode 35 of the actuator unit 21. Thus, when the region of the actuator unit 21 on which the individual electrode 35 is arranged deforms so as to form a convex portion, that convex portion will protrude into the interior of the pressure chamber 10. Thus, the volume of the pressure chamber 10 will decrease. When the volume of the pressure chamber 10 decreases, the pressure of the ink inside the pressure chamber 10 will rise, and the ink will be pushed out from the pressure chamber 10. In this way, ink is discharged from the nozzle 8.

As noted above, each nozzle 8 is aligned at a fixed alignment interval-A along straight lines that are parallel with the main scanning direction of the passage unit 4. On the other hand, the inkjet head 1 of the present embodiment can discharge ink with an interval that is smaller than the alignment interval-A. This is achieved as follows.

Assume a situation in which the inkjet head 1 is used, and one line is printed along the main scanning direction while printing medium is conveyed (see FIG. 3 etc.). First, by conveying a printing medium, the position of the line to be printed will shift from the upstream side to the downstream side in the direction of conveyance. At the point in time in which the position of the line to be printed is directly below the nozzle 8 that is positioned furthest upstream in the transport direction, ink will be discharged from that nozzle 8. Each nozzle 8 is formed at an alignment interval-A along the main scanning direction of the passage unit 4. Thus, at that point in time, dots will be formed on the printing medium at the alignment interval-A.

Next, at the point in time in which the position of the line to be printed is directly below the second upstream nozzle 8 in the transport direction, ink will be discharged from that nozzle 8. In this way, ink will be discharged from each nozzle 8 one, by one in accordance with the conveyance of the printing medium.

When ink is discharged from all of the nozzles 8 as described above, the dots formed by each nozzle 8 will be lined up in the positions of the lines to be printed on the printing medium. On the other hand, as noted above, the position of each nozzle 8 will be reflected on parallel imaginary line with respect to the main scanning direction. These projection points are aligned at equal intervals that are smaller than the alignment interval-A. Thus, each dot printed by each nozzle 8 will be aligned on the printing medium at equal intervals that are smaller than the alignment interval-A. Printing that is a higher resolution than the alignment interval-A will be made possible.

Note that as shown in FIG. 4, each nozzle 8 is formed in a region that faces the pressure chamber groups 6 in the nozzle plate 31. Thus, the nozzles 8 are not formed in regions that are sandwiched by adjacent pressure chamber groups 6.

However, like the pressure chambers 10, the regions in which the nozzles 8 are formed are trapezoidal in shape. In other words, the regions in which the nozzles 8 are formed overlap near the diagonal edges of the pressure chamber groups 6 in the sub scanning direction. Thus, even in the overlapping regions, the projection points at which the formation positions of each nozzle 8 are projected on imaginary line are aligned in equal intervals that are the same as the other regions.

In this way, the inkjet head 1 can continuously print along the entire width in the main scanning direction at intervals that are smaller than the alignment interval-A of nozzles 8.

<Manufacturing Process of Inkjet Head>

Manufacturing process of the inkjet head 1 according to the present embodiment will be described. The manufacturing steps of the head main body 1*a* will be mainly described.

Figure 8:
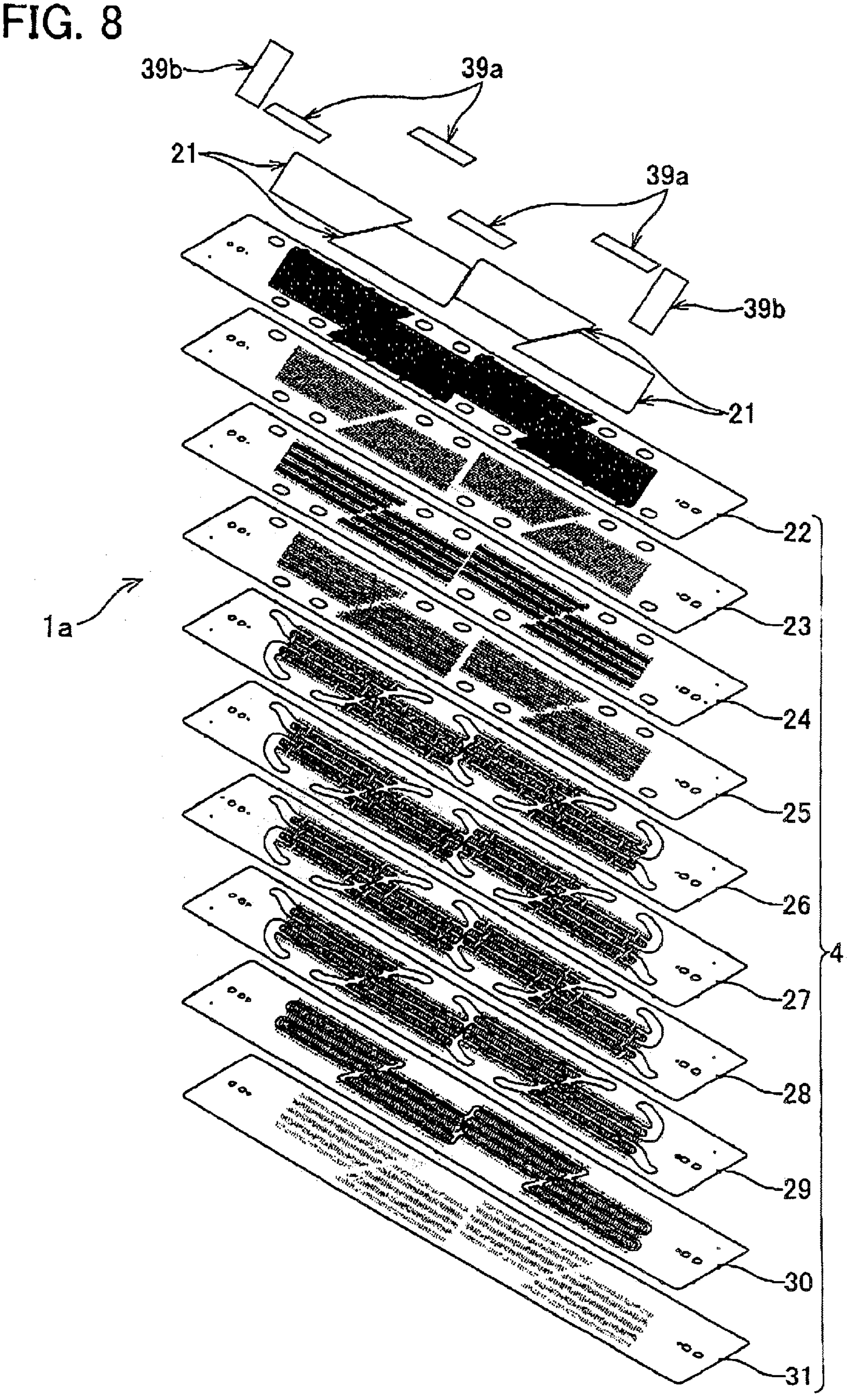
FIG. 8 is a partial oblique exploded view of the head main body shown in FIG. 1.

The head main body 1*a* has various plates laminated together as shown in FIG. 8. The order of the laminated plates is, from the top, the filters 39 (filters 39*a* and 39*b*), the actuator units 21, the cavity plate 22, the base plate 23, the aperture plate 24, the supply plate 25, the manifold plate 26, 27, 28, 29, the cover plate 30, and the nozzle plate 31. The communication holes are formed in the cavity plate 22, the base plate 23, the aperture plate 24, the supply plate 25, the manifold plate 26, 27, 28, 29, the cover plate 30, and the nozzle plate 31, prior to lamination.

The actuator units 21, each plate 22-31, and the filters 39 are laminated together via an adhesive therebetween.

<Overall Manufacturing Process>

Figure 9:
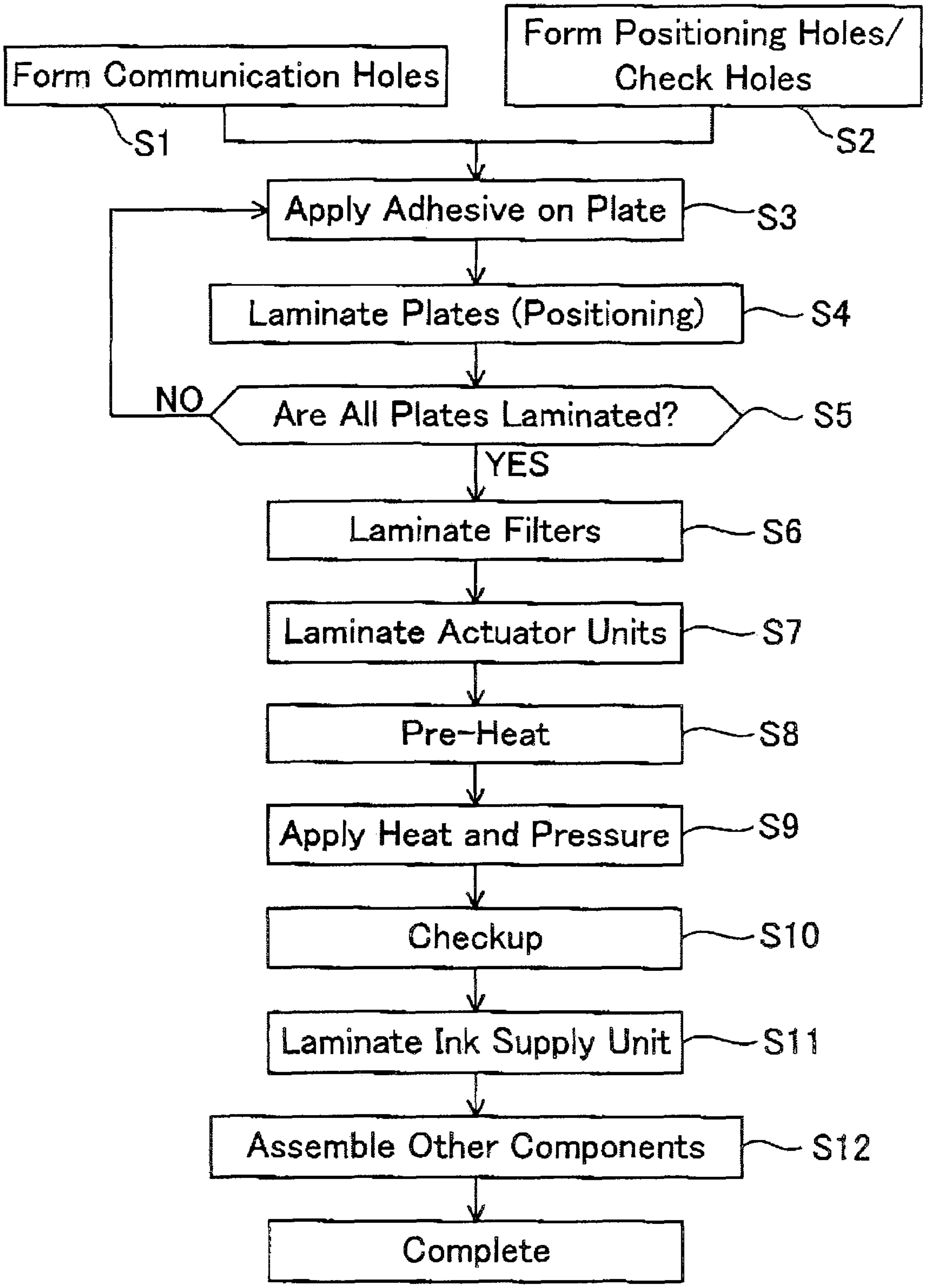
FIG. 9 is a flowchart of the method of manufacturing an inkjet head according to the embodiment.

The flowchart of the overall manufacturing process of the inkjet head 1 according to the present embodiment will be described with reference to FIG. 9.

First, the communication holes, the positioning holes, and the check holes will be formed in each plate 22-31 that forms the passage unit 4 (Steps S1, S2). The formation of the communication holes, the formation of the positioning holes, and the formation of the check holes may be performed in any order.

Next, the adhesive will be applied to each plate 22-31 in which the communication holes, positioning holes, and check holes are formed (Step S3).

Next, the positioning holes 135*a*, 135*b* are used to position each plate 22-31 on which the adhesive was applied while laminating the same (Step S4). Then, Steps S3-S5 will be repeated until all of the plates are laminated together (Step S5:

No, and Steps S3-S5). When the application of the adhesive and the lamination of all of the plates are completed, the process will shift to the next step (Step S5: Yes).

Next, the filters 39 will be laminated on the laminated unit in which all of the plates have been laminated together (Step S6). Furthermore, the actuator units 21 will be laminated (Step S7).

Next, the laminated unit in which the plates, the actuator units, and the filters are laminated together will be pre-heated (Step S8). Pressure will not be applied to the laminated unit at this time.

Next, the adhesive contained in the laminated unit will be cured by applying heat and pressure to the laminated unit. In other words, the adhesion will be completed when Step S9 is performed. In this way, the head main body 1*a* will be completed.

Next, the check holes 138 of the completed head main body 1*a* will be observed, and the accuracy of the positioning of each plate when laminated will be inspected (Step S10).

Next, the positioning holes 136*a* and 136*b* will be used to position the reservoir unit 70 (the ink supply unit) with respect to the head main body 1*a*, and the reservoir unit 70 will be laminated to the head main body 1*a* (Step S11)

Next, other members such as the controller 80 will be assembled together with the laminated head main body 1*a* and the reservoir unit 70 (Step S12). In this way, the inkjet head 1 will be completed.

Each of the aforementioned steps will be described below.

<Communication Hole Formation, Positioning Hole/Check Hole Formation>

The steps of the formation of the communication holes (the communication holes 22*a*, 23*a*, 23*b*, 24*a*, 24*b*, 25*a*, 25*b*, 26*a*, 26*b*, 27*a*, 27*b*, 28*a*, 28*b*, 29*a*, 29*b*, 30*a*, 31*a* shown in FIG. 5), the positioning holes (the positioning holes 135*a*, 135*b*, 136*a*, 136*b* shown in FIG. 3), and check holes (the check holes 138 shown in FIG. 3) will be described.

Figure 10:
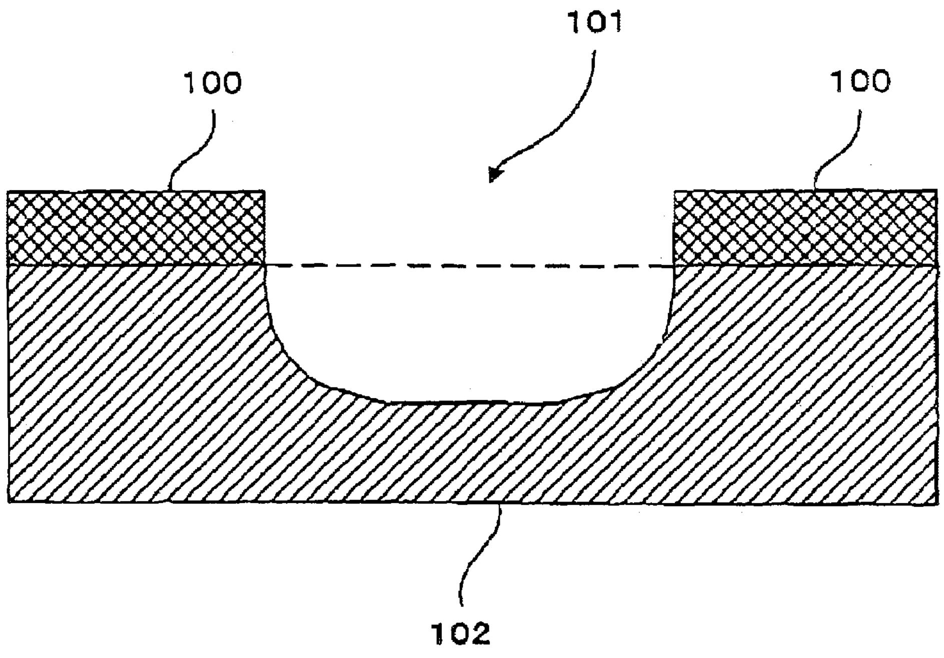
FIG. 10(*a*) describes a step for forming a communication hole in a plate (1).
Figure 10:
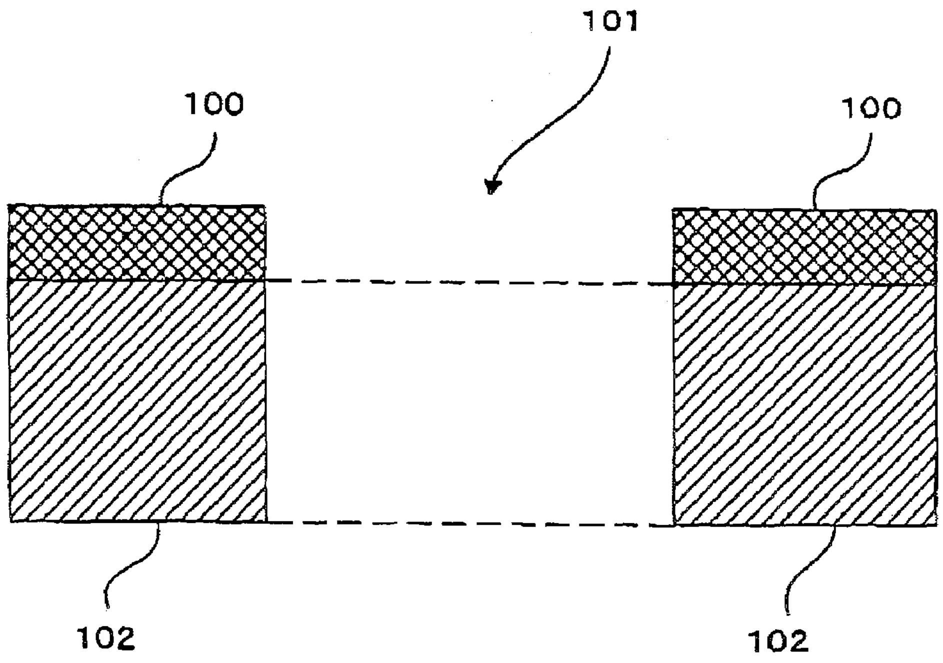

When each plate, such as the cavity plate 22 and the like, is made out of a metal material, the communication holes will be formed by etching process. Etching process will be described with reference to FIG. 10. FIG. 10(*a*) shows a communication hole being formed in the plate 102. FIG. 10(*b*) shows a communication hole formed to pass through the plate 102.

The etching process for forming the communication holes will be performed as follows. First, a positive type (or negative type) resist 100 is applied on the surface of the plate 102. Then, a mask (or an anti-mask) which is possesses the same shape as the planar shape of the communication hole to be formed in the plate 102 is created on the resist 100. The position and shape of the communication hole that is to be formed in the plate 102 will be set to the positions and shapes which will communicate with other communication holes to form the individual ink passage 32 shown in FIG. 5. Note that whether either of the mask or the anti-mask is the same shape as the communication hole will depend on whether the type of resist 100 used is positive or negative. Thereafter, the plate 102 will be irradiated with light from above the mask. In this way, the masked portions of the resist 100 will not be exposed to light, and the other portions thereof will be exposed to light.

Next, the plate irradiated with light will be immersed in a developing solution. In this way, either the exposed portions of the resist 100 that was exposed to light or the non-exposed portions that were not exposed to light will be dissolved in the developing solution. Thus, the resist 100 will be removed from the portion on the surface of the plate 102 that will become the opening to the communication hole, and the remaining resist 100 will cover the other portions.

Next, an etchant will be applied to the surface of the plate 102 covered by the resist 100. In this way, as shown in FIG. 10(*a*), a non-resist portion 101 in which the surface of the plate 102 is not covered by the resist 100 will gradually dissolve in the etchant from the surface thereof. Then, after a predetermined period of time has elapsed, the non-resist portion 101 of the plate 102 will be completely dissolved from the upper to the rear surface thereof. Finally, the etchant and the resist 100 will be removed from the surface of the plate 102. In this way, a communication hole that passes through the plate 102 will be formed (FIG. 10(*b*)).

Note that some of the communication holes that form the individual ink passage 32 will not pass through the plates, such as the apertures 12 (see FIG. 6). Thus, the communication holes that do not pass through the plates will be formed by half-etching. In other words, an etchant will be applied to a plate that is covered, with a resist. Thereafter, etching will be stopped before a communication hole completely passes through the plate. The resist will be removed. In this way a communication hole that does not pass through a plate can be formed.

The communication holes shown in FIG. 5 excepting the communication hole 31*a* which is formed in the nozzle plate 31, the positioning holes 135*a*, 135*b*, 136*a*, 136*b*, and the check holes 138, shown in FIG. 7 will be formed in each plate 22-33 by this etching process.

The nozzles 8 to be formed in the nozzle plate 31 will be formed by press work. The nozzles 8 correspond to the communication holes 31*a*. In this case, the nozzle plate 31 will be formed as follows. First, a plurality of nozzle holes will be formed in a metal plate by means of a pressing device having punches arranged in the same pattern as the nozzles 8 on the nozzle plate 31. Next, the protrusions produced on the opposite side of the metal plate by the pressing will be polished flat. Furthermore, the shape of the nozzle plate 31 will be cut out from the polished metal plate. The nozzle plate 31 will be formed thereby.

<Adhesive Application>

The adhesive application step will now be described.

An adhesive will be applied to each plate in which the communication holes, the positioning holes, and check holes have been formed. A thermosetting adhesive such as an epoxy resin or the like is employed as the adhesive.

Figure 11:
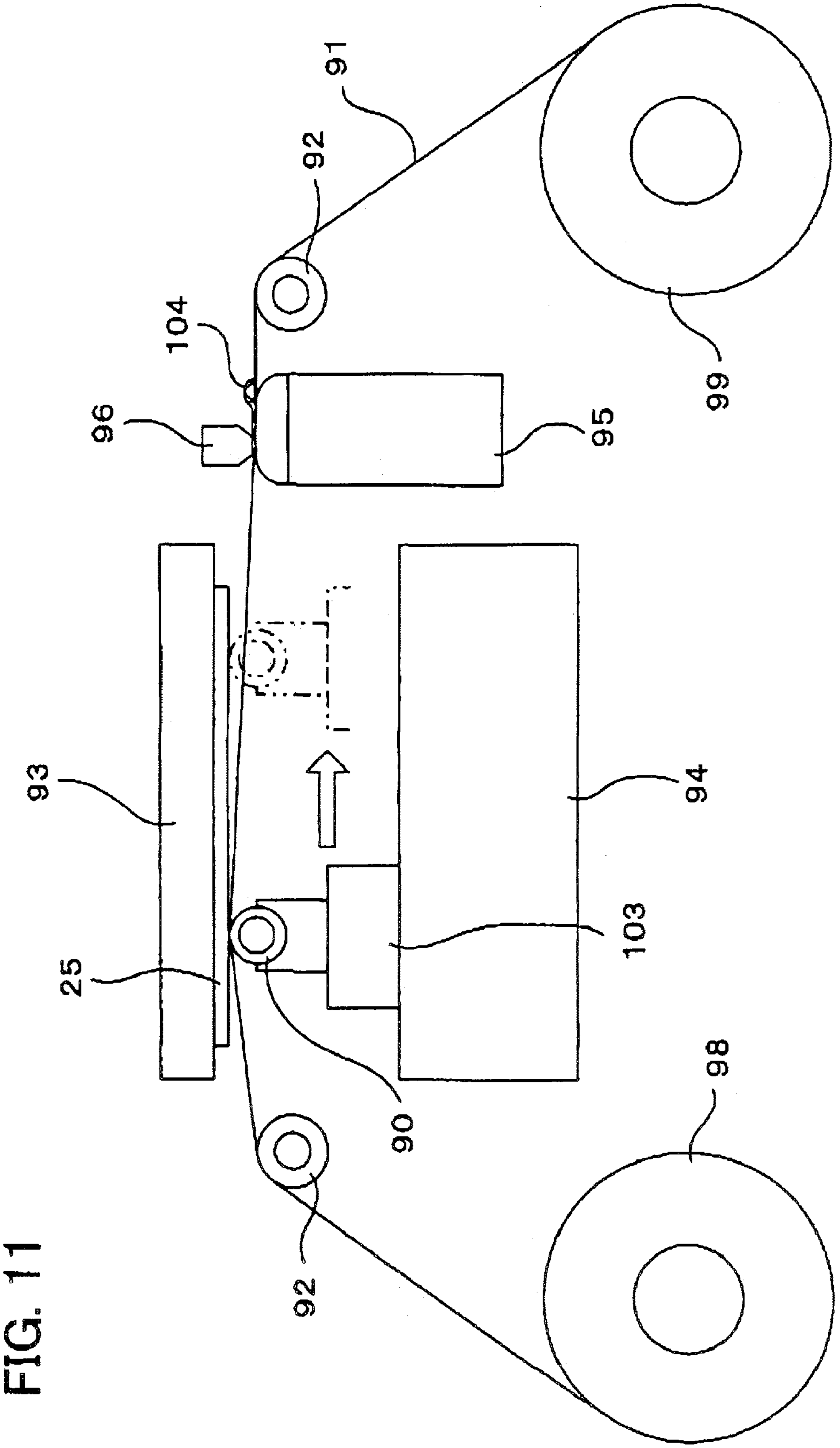
FIG. 11 is a schematic view of an adhesive application device that applies adhesive to the plates that are included in a passage unit shown in FIG. 8.

FIG. 11 shows an adhesive application device which serves to apply the adhesive to each plate. The adhesive application device has an application table 95 and a blade 96. A film 91 is arranged on the application table 95. The adhesive will be applied to the film 91 on the application table 95 in order to be transferred to the plate such as the nozzle plate 31. The blade 96 is arranged on the upper portion of the application table 95. This blade 96 is employed in order to flatten the adhesive on the film 91.

The adhesive application device has a work placement plate 93. The plates on which adhesive is to be applied will be placed on the lower surface of the work placement plate 93.

The adhesive application device has a transfer roller 90 and a transfer roller moving unit 94. The upper end of the transfer roller 90 is positioned across a small gap between it ands the lower surface of the plate placed on the work placement plate 93. The transfer roller moving unit 94 can move the transfer roller 90 in the lengthwise direction of the work placement plate 93 (the right-left direction in FIG. 11).

The adhesive application device has a guide roller 92, a winding drum 98, and a supply drum 99. The film 91 is wound onto the supply drum 99. The supply drum 99 is rotatably placed onto the adhesive application device. When the film 91 is pulled out, the supply drum 99 will rotate.

One end of the film 91 that has been pulled out from the supply drum 99 will be fixed to the winding drum 98 via two guide rollers 92. The winding drum 98 will be driven by a drum drive unit not shown in the drawings, and can thereby wind the film 91. The film 91 pulled out from the supply drum 99 will pass between the two guide rollers 92, pass over the application table 95, and over the upper end of the transfer roller 90.

By using an adhesive application device having this type of structure, an adhesive will be applied in the following steps to each plate.

First, the transfer roller 90 will be moved to a position that is furthest away from the application table 95. Then, a plate will be placed on the work placement plate 93. FIG. 11 shows the supply plate 25 placed thereon as an example.

Next, an adhesive 104 is placed on the film 91 that passes over the upper portion of the application table 95. Then, the winding drum 98 is driven to wind the film 91. At this point, the adhesive 104 placed on the film 91 will be flattened to a predetermined thickness through the gap between the blade 96 and the application table 95.

Next, the winding drum 98 will be driven to wind the film 91 until the adhesive flattened on the film 91 is positioned directly below the work placement plate 93.

Next, the transfer roller 90 will be moved in the direction of the arrow shown in FIG. 11 from one end of the supply plate 25 placed on the work placement plate 93 to the other end thereof. In this way, the film 91 will be sequentially pressed onto the lower surface of the supply plate 25 by means of the upper end of the transfer roller 90. In this way, the adhesive flattened on the upper surface of the film 91 can be applied uniformly to the supply plate 25.

<Plate Lamination>

The plate lamination steps that laminate each plate 22-31 on which the adhesive has been applied will be described. The plates 22-31 will be laminated together to form the passage unit 4 as described above.

Figure 12:
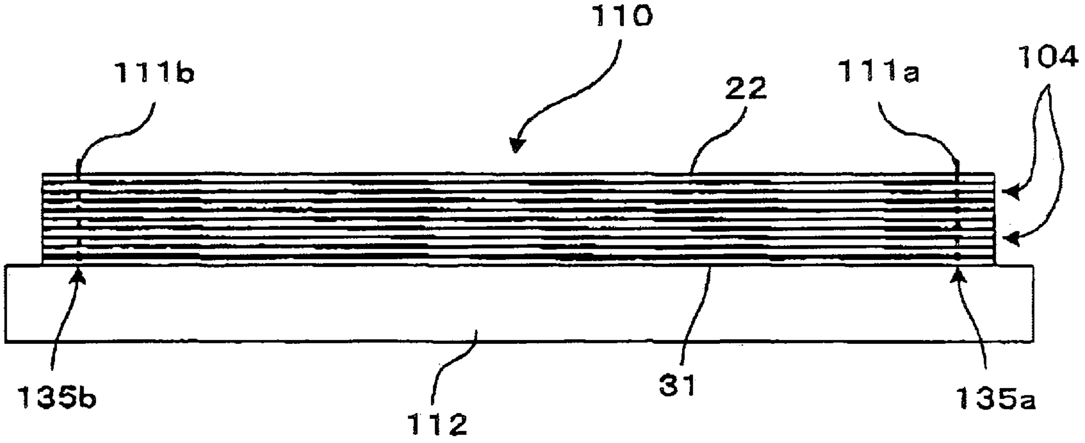
FIG. 12 is a figure for describing a step for laminating the plates that are included in the passage unit shown in FIG. 8.

As shown in FIG. 12, first guide, pins 111*a* and 111*b* are fixed to a lamination table 112 for laminating each plate 22-31. The two first guide pins 111*a* and 111*b* are arranged in positions that are separated by the same distance as the distance between the positioning holes 135*a* and 135*b* (first positioning holes) formed in each plate 22-31.

The positioning holes 135*a* and 135*b* formed in each plate are used to position each plate 22-31 during lamination. First, the nozzle plate 31 is moved above the lamination table 112. The nozzle plate 31 is positioned so that the two positioning holes 135*a* and 135*b* of the nozzle plate 31 are positioned on the tips of the two first guide pins 111*a* and 111*b*. Then, the first guide pins 111*a* and 111*b* are passed through the positioning holes 135*a* and 135*b* while moving the nozzle plate 31 downward, and the nozzle plate 31 is place on the lamination table 112.

Next, the cover plate 30 is positioned in the same as described above, and placed on top of the nozzle plate 31. When the cover plate 30 is placed on the nozzle plate 31, the positioning holes 135*a* and 135*b* formed in the cover plate 30*b* pass through the first guide pin 111*a* and 111*b* respectively. Furthermore, each plate 22-29 is sequentially laminated.

In other words, in the plate lamination step, the first guide pins 111*a*, 111*b* extend through each of the first positioning holes 135*a*, 135*b* while each plate is laminated, so that each respective plate 22-31 is arranged in a predetermined relative position in the plate-laminating-direction. A predetermined relative position means the relative position of the plates when laminated such that each respective communication hole overlaps as designed in the plate-laminating direction.

When each plate is to be laminated, each plate will be laminated such that the adhesive 104 will be interposed between any two adjacent plates. Note that there is no particular limitation as to which surface of the plates the adhesive is to be applied.

By laminating each plate 22-31 in this manner, a laminated unit 110 will be formed that is laminated via the adhesive 104. The communication holes formed in the plates will communicate with each other in the interior of the laminated unit 110 with designed relative position due to the positioning by the first positioning holes 135*a* and 135*b*, and the first guide pin 111*a* and 111*b*. In this, way, the individual ink passages 32 shown in FIG. 5 will be formed in the interior of the laminated unit 110 with designed relative position. Note that the laminated unit 110 corresponds to the passage unit 4. In the heat and pressure application step described below, the passage unit 4 will be completed by heating and curing the adhesive inside the laminated unit 110.

<Filter Lamination>

The filter lamination step will be described.

Figure 13:
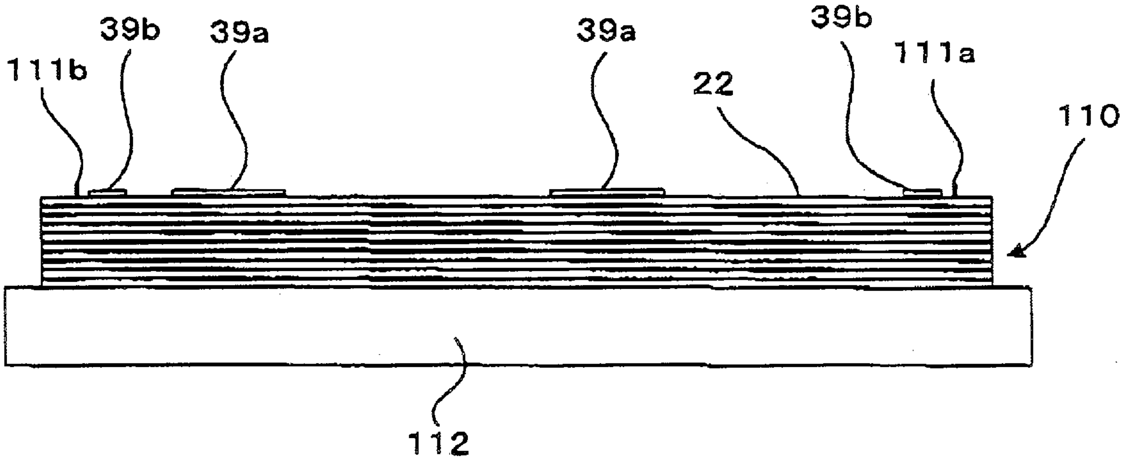
FIG. 13 is a figure for describing a step for laminating filters to the laminated body shown in FIG. 12.

As shown in FIG. 13, the filters 39*a* and 39*b* are laminated on the laminated unit 110 in which each plate 22-31 is laminated. The filters 39*a* and 39*b* are laminated on the upper surface of the laminated unit 110, in regions in which the actuator units 21 are not laminated (see FIG. 3).

<Actuator Unit Lamination>

The actuator lamination step will be described.

Figure 14:
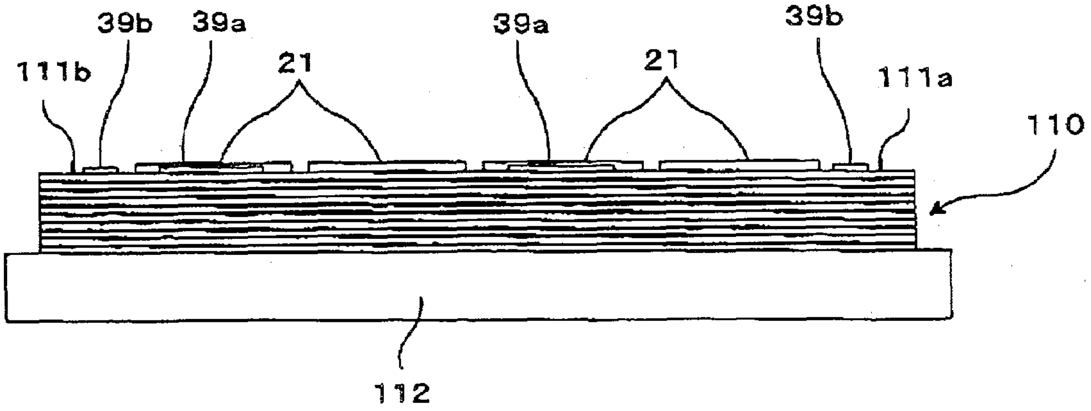
FIG. 14 is a figure for describing a step for laminating an actuator unit to the laminated body shown in FIG. 13.

As shown in FIG. 14, actuator units 21 are laminated on the laminated unit 110 in which each plate 22-31 and the filters 39*a* and 39*b* are laminated. The actuator units 21 are positioned and laminated so that each individual electrode 35 is arranged inside the region facing the corresponding pressure chamber 10 (see FIG. 4). The actuator units 21 are arranged on the laminated unit 110 so that the individual electrodes 35 are positioned furthest apart from the cavity plate 22. The cavity plate 22 is the plate which is arranged outermost side of the laminated unit 110. In other words, the actuator units 21 are attached to the laminated plates so that the individual electrodes 35 are positioned further from the cavity plate 22 than the common electrode 34.

As shown in FIG. 6, the top surfaces of the lands of the individual electrodes 35 swell from the surface of the piezoelectric film 41. The surface on which the individual electrodes 35 are arranged of the actuator unit 21 is rough. On the other hand, the common electrode is formed in flat. The surface on which the individual electrodes 35 are not arranged of the actuator unit 21 is flat. Therefore, by attaching the actuator unit 21 to the laminated plates so that the individual electrodes 35 are positioned further from the cavity plate 22 than the common electrode 34, a contact surface between the actuator unit 21 and the cavity plate 22 can become flat, the contact surface is filled by adhesive. The actuator unit 21 and laminated unit 110 can adhered uniformly in the adhesion step that described later.

In the present embodiment, the lamination of each structural member of the head main body 1*a* will be complete at the point at which the actuator units 21 are laminated. At this point in time, filter holes (not shown in the drawings) and the nozzles 8 are the only locations at which the interior part (e.g., the individual ink passages 32 and the like) of the head main body 1*a* communicates with the outside. The nozzles 8 and the filter holes are extremely small boles. For example, the diameter of the opening of a nozzle 8 is about 20 μm, and the diameter of a filter hole is smaller than the diameter of the opening of a nozzle 8. In other words, the ink passages formed in the head main body 1*a* communicate with the outside of the head main body 1*a* via only the extremely small diameter nozzles 8 and filter holes. In this way, the amount of foreign matter, dirt, dust, and the like that enters into head main body 1*a* in each step after lamination can be reduced. It is possible for this foreign matter to clog the nozzles 8. In addition, it is possible for this foreign matter to worsen the discharging characteristics of the ink to be discharged from the nozzles 8.

<Pre-Heating>

Figure 15:
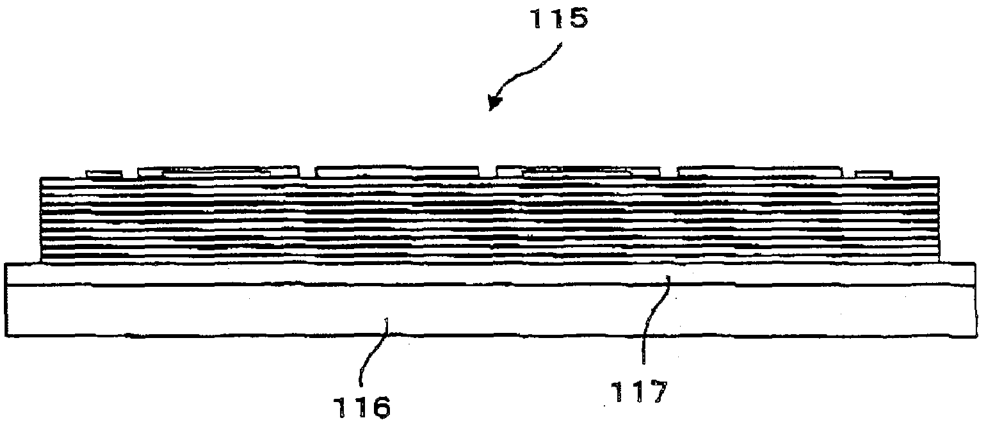
FIG. 15 is a figure for describing a step for pre-heating the laminated body shown in FIG. 14.

The pre-heating step will be described with reference to FIG. 15.

A laminated unit 115 in which each plate 22-31, the actuator units 21 and the filters 39 are laminated, will be heated as follows. First, the laminated unit 115 that is laminated via an adhesive will be placed on a heating table 117. The heating table 117 will be placed on a heater 116. The laminated unit 115 will be heated by the heater 116 until a temperature of the laminated unit 115 reaches near the curing temperature of the adhesive contained in the interior of the laminated unit 115. In the pre-heating step, the laminated unit 115 may be heated up to near the curing temperature or higher, to the extent that flow ability is maintained without curing the adhesive contained in the laminated unit 115. For example, the laminated unit 115 may be heated up to the temperature at which the laminated unit 115 is heated in the heat and pressure application step described below. Regardless, only heating will be performed, without the application of pressure, until a predetermined temperature is achieved.

Thus, when the heat and pressure application step is continued from the pre-heating step, highly precise adhesion can be performed as follows. In other words, when the laminated unit 115 is heated in the pre-heating step, the actuator units 21, the cavity plate 22, and the like will thermally expand. Here, the thermal expansion coefficients of the actuator units 21 and the cavity plate 22 may be different. Thus, when the laminated unit 115 is heated, distortion will be generated between the actuator units 21 and the cavity plate 22 due to the differences in thermal expansion.

When the laminated unit 115 is not pre-heated, but is heated while pressure is applied thereto, variations in the stress generated by the distortion as noted above will be appeared, and uniform adhesion will not be achieved. On the other hand, when the heat and pressure application step is to be continued after the laminated unit 115 was pre-heated without applying pressure thereto, pressure will be applied after the lamination plates and the like have sufficiently expanded in the pre-heating step, and the variations in the stress noted above will not be produced. In this way, the actuator units 21 and the cavity plate 22 can be uniformly adhered with good precision. Even if some of the laminated plates have different thermal expansion coefficients, those plates can be uniformly adhered with good precision by being performed the pre-heating step because of same reason described above.

<Heat and Pressure Application>

The heat and pressure application step (the laminated plate adhesion step) that applies heat and pressure to the pre-heated laminated unit 15 will be described below.

Figure 16:
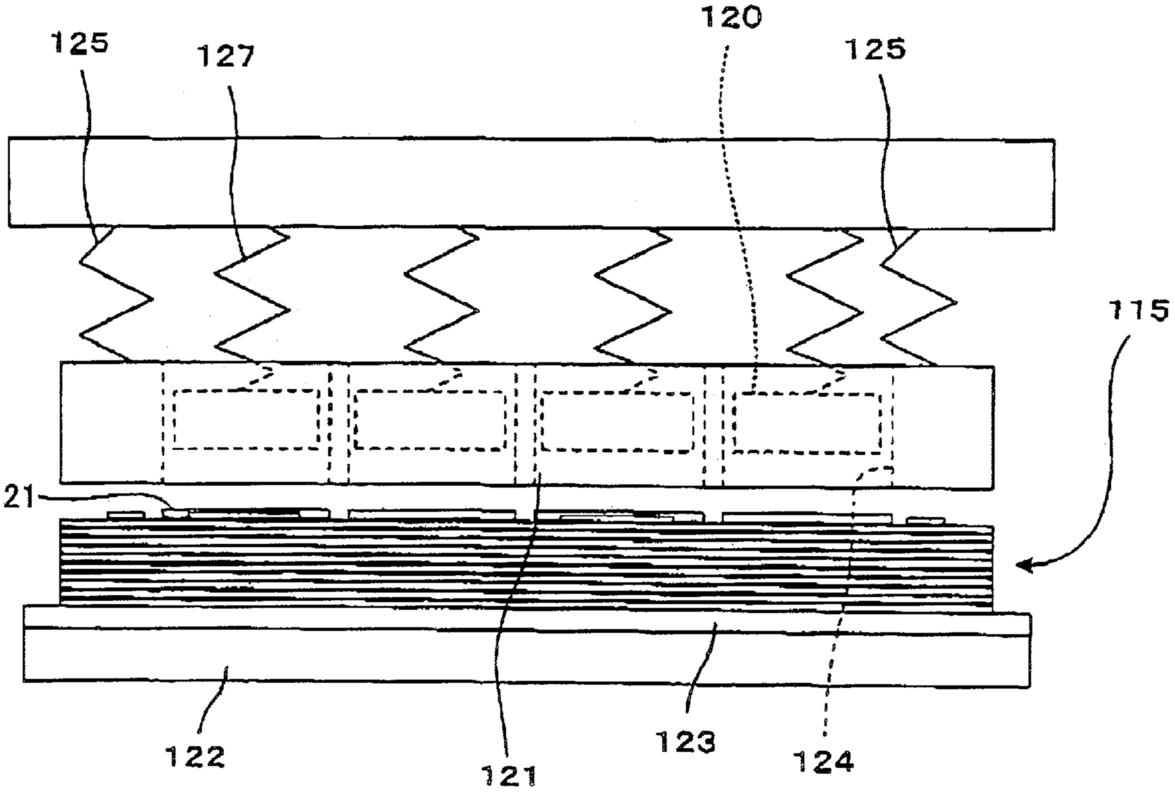
FIG. 16 is a figure for describing a step for heating the laminated body shown in FIG. 14 while applying pressure to the same.

FIG. 16 shows a device that applies heat and pressure to the laminated unit 115. This heat and pressure application device has three types of heaters. The first heater is a lower heater 122. The lower heater 122 applies heat to the bottom of the laminated unit 115 placed on the heating table 123.

The second heater is four actuator heaters 120 that serve to apply heat to the actuator-laminated-regions in which the actuator units 21 are laminated to the laminated unit 115. The actuator heaters 120 have substantially the same planar shape as the actuator units 21. The actuator heaters 120 are arranged in positions that face the actuator units 21 on the laminated unit 115 that are disposed below.

Heater drive arms 127 are attached to the actuator heaters 120. The heater drive arms 127 can move the actuator heaters 120 downward. The heater drive arms 127 can press the actuator heaters 120 to the actuator units 21 disposed below, and can apply pressure to the actuator units 21. In this way, the actuator heaters 120 can apply heat and pressure to the actuator-laminated-regions on which the actuator units 21 are laminated.

The third heater is an upper heater 121. The upper heater 121 has the same planar shape as the planar shape of the laminated unit 115. In other words, the planar shape of the upper heater 121 is rectangular, and has the same size as the planar shape of the laminated unit 115. Then, the upper heater 121 is arranged in positions that face the laminated unit 115 placed below.

Actuator avoidance holes 124 which pass through the upper heater 121 in the vertical direction are arranged in the upper heater 121. The actuator avoidance holes 124 have substantially the same planar shape as the actuator units 21. In addition, the size of the actuator avoidance holes 124 is slightly larger than the actuator units 21. The actuator avoidance holes 124 are formed in positions that face the actuator units 21 on the laminated unit 115 that is disposed below the upper heater 121. In addition, because the actuator heaters 120 pass inside the actuator avoidance holes 124, vertical movement is possible without hindering the upper heater 121.

Heater drive arms 125 are attached to the upper heater 121. The heater drive arms 125 can move the upper heater 121 downward. The heater drive arms 125 can press the upper heater 121 to the laminated unit 115 disposed below, and can apply pressure to the laminated unit 115. At this point, the upper heater 121 is in contact with the filters 39. Thus, the upper heater 121 can avoid the actuator-laminated-regions on which the actuator units 21 are laminated by means of the actuator avoidance holes 124, and can apply pressure to the laminated unit 115 via the filters 39. In other words, the upper heater 121 can apply heat and pressure to the actuator-not-laminated-regions on which the actuator units 21 of the laminated unit 115 are not laminated.

Note that by arranging filter avoidance holes (not shown in the drawings) or the like that have the same planar shapes as the filters 39 on the lower surface of the upper heater 121, the stepped portions caused by the filters 39 laminated on the laminated unit 115 can be avoided, and pressure can be more uniformly applied to the lamination regions of the filters 39 and the regions other than these.

By means of the aforementioned device configuration, heat and pressure will be applied to the laminated unit 115 as follows. First, the laminated unit 115 will be placed on the heating table 123 after the pre-heating step. The heating table 123 will be placed on the lower heater 122. Next, the actuator heaters 120 and the upper heater 121 will be moved downward. Pressure will be applied respectively to the actuator-laminated-regions and the actuator-not-laminated-region on the laminated unit 115, while being heated up to a predetermined temperature that is equal to or greater than the curing temperature of the adhesive.

Here, force is applied separately to the actuator-laminated-regions and the actuator-not-laminated-region. The size of the forces applied will differ from each other. The size of the force applied to each respective region will be adjusted so that the size of the pressure applied to each respective region is the same. In this way, each respective actuator-laminated-region and actuator-not-laminated-region can be adhered uniformly.

The adhesive contained in the laminated unit 115 will cure by means of the heat and pressure application step, and the adhesion will be complete. In this way, the head main body 1*a* will be complete.

Note that the heater 116 (see FIG. 15) or the like that is used in the pre-heating step may also be used as is in the heat and pressure application step as the lower heater 122 shown in FIG. 16. In addition, as noted above, the size of the forces applied to the actuator-laminated-regions and the actuator-not-laminated-regions on the laminated unit 115 are set so that the pressure applied to each respective region will be the same. The forces applied to each respective region may be set based upon adhesion and lamination parameters other than pressure.

<Checkup>

The checkup step will now be described.

Figure 17:
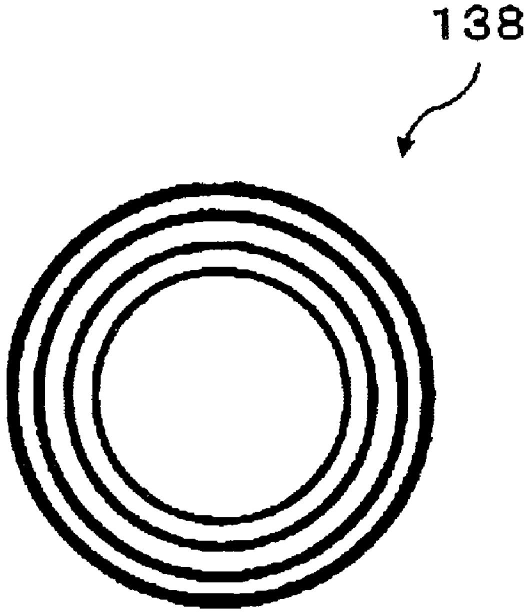
FIG. 17(*a*) shows a check hole of the head main body completed by means of the step described in FIG. 16, viewed from the plate-laminating-direction (1).
Figure 17:
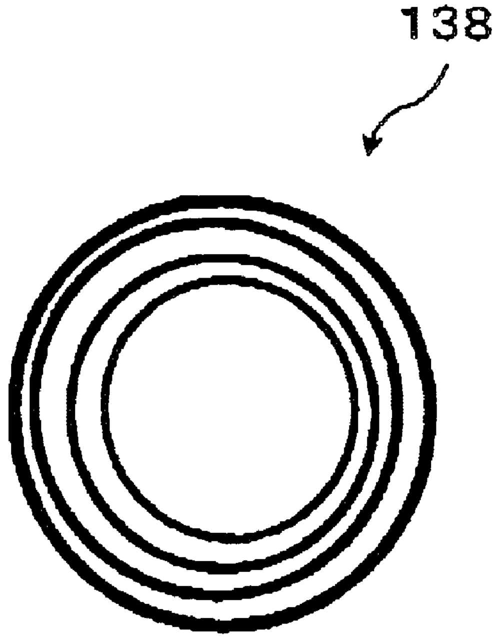

As noted above, when each plate is laminated in a predetermined relative position, ten concentric circles having different radii will be observed when the check holes 138 are observed from the nozzle plate 31 side of the head main body 1*a*. Each circle represents a planar contour of the corresponding check hole formed in each plate. FIG. 17*a* shows the results of the observation of the check holes 138 in the head main body 1*a* in which each plate has been accurately positioned and laminated. Note that although ten circles will normally be observed when the check holes 138 are inspected, only some of the circles are illustrated in FIG. 17 in order to easily see the drawing.

On the other hand, as shown in FIG. 17(*b*), when the positions of some of the plates have shifted, circles whose centers have shifted will be observed when inspecting the check holes 138 of the head main body 1*a*. In this way, it can be checked, up whether any of the plates that are included in the head main body 1*a* have shifted, i.e., the relative position of each plate can be inspected. Furthermore, a head main body 1*a* can be rejected from the steps thereafter depending upon the amount of shift in the plates as it does not satisfy a design tolerance for relative position of the plates. In addition, the head main body 1*a* may be classified based upon the amount of shifting.

<Lamination of the Reservoir Unit>

The steps of laminating the completed head main body 1*a* with the reservoir unit 70 will be described.

The reservoir unit 70 (the ink supply unit), as noted above, has a lamination structure in which six plates 71-76 that are planar and rectangular in shape are laminated together (see FIG. 2). The reservoir unit 70 is formed by laminating the plates 71-76 in which the penetration holes 71*a* and the ink storage 72*a* have been formed. Reservoir unit side positioning holes (not shown in the drawings) that correspond to the second positioning holes 136*a*, 136*b* formed in the head main body 1*a* are formed in the reservoir unit 70. When the reservoir unit side positioning holes match the position between the first positioning holes 136*a*, 136*b*, the penetration holes 76*a* of the reservoir unit 70 and the openings 3*a* of the head main body 1*a* will communicate with each other.

Figure 18:
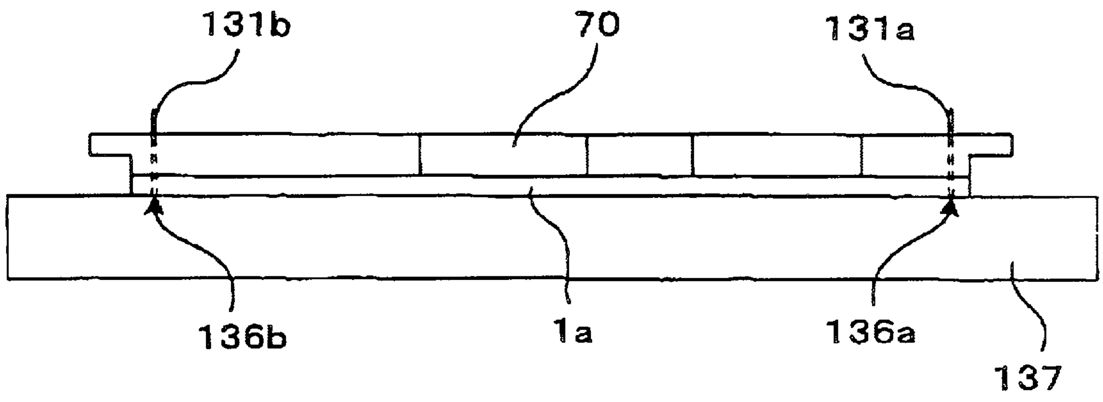
FIG. 18 is a figure for describing a step for laminating the head main body and a reservoir unit shown in FIG. 1.

FIG. 18 shows the head main body 1*a* and the reservoir unit 70 positioned and laminated together. The lamination sequence is as follows. Note that although the lamination of the reservoir unit 70 and the head main body 1*a* are performed first, and the FPCs 50 and the individual electrodes 35 of the actuator units 21 are then connected, the FPCs 50 are not illustrated in FIG. 18 in order to simplify the drawing.

First, an adhesive is applied to the surface of the head main body 1*a* on which the reservoir unit 70 will be applied. The positioning holes 136*a* and 138*b* will be placed on second guide pins 131*a* and 131*b* fixed to the lamination table 137, and the head main body 1*a* will be arranged on the lamination table 137. Next, the reservoir unit side positioning holes formed in the reservoir unit 70 will be placed on the second guide pins 131*a* and 131*b* while the reservoir unit 70 is laminated on the head main body 1*a*.

In this way, the penetration holes 76*a* of the reservoir unit 70 and the openings 3*a* of the head main body 1*a* will communicate with each other (see FIG. 2 and FIG. 3). Then, ink passages in which the penetration hole 71*a* of the reservoir unit 70, a connected ink tank, and manifold passages 5 of the head main body 1*a* communicate with each other are formed in the reservoir unit 70.

Note that the reservoir unit side positioning holes formed in the reservoir unit 70 need not pass through the reservoir unit 70. In this case, second guide pins 131 that are shorter than the length that matches the thickness of the reservoir unit 70 and the thickness of the head main body 1*a* will be used in the positioning task.

In addition, the second positioning holes 136*a*, 136*b* on the head main body 1*a* side need not pass through the head body 1*a*. The second positioning holes 136*a*, 136*b* may be formed in the uppermost laminated plate of the head main body 1*a* (the plate that contacts with the reservoir unit 70). In this case, it is preferable that the reservoir unit side positioning holes of the reservoir unit 70 pass through the reservoir unit 70. In addition, the second guide pins 131 that are shorter than the length that matches the thickness of the reservoir unit 70 and the thickness of the head main body 1*a* can be used in the positioning step. After the second guide pins 131 pass through the reservoir unit side positioning holes of the reservoir unit 70, the head main body 1*a* will be laminated thereon.

<Completion of Inkjet Head>

The inkjet head 1 will be completed by assembling components such as the controller 80, the upper cover 51, the lower cover 52, and the like to the head main body 1*a* and the reservoir unit 70 that are laminated as described above.

<Modifications>

Although preferred embodiments of the present invention were described above, the present invention is not limited to the embodiments described above, and various design modifications are possible within the scope of the claims.

For example, in the aforementioned embodiment, after the plates (plates 22-33) that form the passage unit 4, the actuator units 21, and the filters 39, are completely laminated, the adhesive was cured by applying heat and pressure. However, the heat and pressure application step can be performed without laminating the filters 39, and the filters 39 can then be separately laminated. In this case, a step will be added in which the filters 39 are laminated. Because of this, the inflow of foreign matter and the like to the head main body 1*a* may occur. However, the amount of adhesive used in each structural component other than the filters 39 will not change, and there is little difference in the ability to make the thickness of the adhesive uniform. Thus, in this case as well, the problem in which the ink discharging characteristics become non-uniform due to non-uniformity of the thickness of the adhesive will not occur.

A modification of the present embodiment that may be performed in accordance with the size, shape, thickness, and the like of the actuator units 21 is to make the step of laminating the actuator units 21 separate from the step of laminating the plates that form the passage unit 4. The actuator units 21 are normally extremely thin and brittle objects. Thus, by making the lamination of the actuator units 21 separate, the lamination of the actuator units 21 can be carried out more carefully. This is a strong point, from the standpoint of increasing the overall manufacturing yield of the inkjet head.

The step of laminating the filters 39 and the actuator units 21 may be performed separately from the step of laminating the plates that form the passage unit 4. Even in this case, the quantity of adhesive can be optimized, and the thickness of the adhesive can be made uniform, when laminating the plates that form the passage unit 4. The effect of making the ink discharging characteristics of the ink passages formed inside the passage unit 4, and particularly each individual ink passages 32, uniformity is obtained in the same way as the present embodiment.

In the aforementioned embodiment, four positioning holes and two check holes are formed in each plate, and two each of these holes are employed in the positioning step and the checkup step. However, the positioning holes and the check holes that are formed in each plate may be reduced, and two holes may be used in two or more steps.

Furthermore, in the present embodiment, the checkup is performed by using the check holes 138 after the head main body 1*a* was completed, however the checkup may be performed at any time after the lamination of the plates 22-31 is completed.

In the aforementioned embodiment, there is no limitation as to when the individual electrodes 35 can be placed on the actuator units 21. Thus, the individual electrodes 35 may be placed on the actuator units 21 before the actuator units 21 are laminated on the laminated unit 110. In addition, the individual electrodes 35 may be placed on the actuator units 21 after the actuator units 21 are laminated on the laminated unit 110. In the latter case, the actuator units 21 that are laminated on the laminated unit 110 are not completed, but in the present specification, actuator units 21 in which the individual electrodes 35 have not been placed on the surface thereof are referred to as actuator units 21 for convenience.

What is claimed is:

1. A method of manufacturing an inkjet head having plates that are laminated, an individual ink passage that penetrates the laminated plates, a nozzle at one end of the individual ink passage in an outermost plate of the plates, and an actuator unit, comprising:

a step of forming a communication hole in each of the plates;

a step of laminating the plates with thermosetting adhesive therebetween so that the communication holes are overlapped with each other in a plate-laminating-direction, thereby making the communication holes form the individual ink passage and the nozzle;

a step of adhering the laminated plates by applying pressure to the laminated plates in the plate-laminating-direction while heating the laminated plates; and a step of laminating the actuator unit with thermosetting adhesive onto the laminated plates so as to cover the communication hole formed in one of the plates that faces the actuator unit, wherein the actuator unit laminating step is performed before the adhering step, and wherein, in the adhering step, the actuator unit and the laminated plates are adhered simultaneously by applying pressure to the actuator unit and the laminated plates in the plate-laminating-direction while heating the actuator unit and the laminated plates.

2. A manufacturing method as in claim 1, wherein the actuator unit has a piezoelectric film, individual electrodes, and a common electrode, the piezoelectric film is sandwiched by the individual electrodes and the common electrode, the inkjet head has a plurality of the individual ink passages and the nozzles, in the communication hole forming step, a plurality of the communication holes are formed in each of the plates, each group of the communication holes overlapped in the plate-laminating-direction forms a corresponding one set of the individual ink passage and the nozzle, and in the actuator unit laminating step, the actuator unit is laminated onto the laminated plates so that each of the individual electrodes is disposed at substantially the same position, in the plate-laminated-direction, to a corresponding one of the communication holes formed in the one of the plates that faces the actuator unit, the common electrode is disposed so as to cover at least two of the communication holes formed in the one of the plates that faces the actuator unit, and the individual electrodes are positioned farther than the common electrode from the laminated plates.

3. A manufacturing method as in claim 1, wherein, in the adhering step, pressure is applied respectively on both an actuator-laminated-region of the laminated plates and an actuator-not-laminated-region of the laminated plates, the actuator-laminated-region is a region on which the actuator unit is laminated, the actuator-not-laminated-region is a region on which the actuator unit is not laminated.

4. A manufacturing method as in claim 3, wherein substantially the same pressure is applied on both the actuator-laminated-region and the actuator-not-laminated-region.

5. A manufacturing method as in claim 1, further comprising:

a step of forming a check hole in each of the plates, the check hole forming step is performed before the plate laminating step, each of the check holes is formed so that centers of the check holes are aligned in-line in the plate-laminating-direction when the plates are laminated in a predetermined relative position; and a step of checking alignment of the centers of the check holes in the plate-laminating-direction.

6. A manufacturing method as in claim 5, wherein the check holes are formed to be geometrically similar and are formed so that the size of area of each of the check holes becomes larger as the plate positioned farther from the plate positioned at one side of the laminated plates.

7. A method of manufacturing an inkjet head having plates that are laminated, an individual ink passage that penetrates the laminated plates, and a nozzle at one end of the individual ink passage in an outermost plate of the plates, comprising:

a step of forming a communication hole in each of the plates;

a step of laminating the plates with thermosetting adhesive therebetween so that the communication holes are overlapped with each other in a plate-laminating-direction, thereby making the communication holes form the individual ink passage and the nozzle;

a step of adhering the laminated plates by applying pressure to the laminated plates in the plate-laminating-direction while heating the laminated plates; and a step of laminating a filter with thermosetting adhesive onto the laminated plates, the filter is laminated in order to remove dirt from ink flowing into the individual ink passage, and the filter laminating step is performed before the adhering step;

wherein, in the adhering step, the filter and the laminated plates are adhered simultaneously by applying pressure to the filter and the laminated plates in the plate-laminating-direction while heating the filter and the laminated plates.

8. A method of manufacturing an inkjet head having plates that are laminated, an individual ink passage that penetrates the laminated plates, and a nozzle at one end of the individual ink passage in an outermost plate of the plates, comprising:

a step of forming a communication hole in each of the plates;

a step of laminating the plates with thermosetting adhesive therebetween so that the communication holes are overlapped with each other in a plate-laminating-direction, thereby making the communication holes form the individual ink passage and the nozzle;

a step of adhering the laminated plates by applying pressure to the laminated plates in the plate-laminating-direction while heating the laminated plates; and a step of forming a first positioning hole in each of the plates, the first positioning hole forming step is performed before the plate laminating step;

wherein, in the plate laminating step, the plates are laminated by passing a first guide pin through each of the first positioning holes so that the communication holes are overlapped with each other in the plate-laminating-direction.

9. A manufacturing method as in claim 8, wherein the inkjet head further has an ink supplying unit that supplies ink to the individual ink passage, the ink supplying unit has a hole, and the method further comprises:

a step of forming a second positioning hole in at least one of the plates that faces the ink supplying unit; and a step of attaching the ink supplying unit to the laminated plates while positioning the ink supplying unit to the laminated plates by passing a second guide pin through the second positioning hole and the hole of the ink supplying unit.

10. A manufacturing method as in claim 9, further comprising:

a step of forming a check hole in each of the plates, the check hole forming step is performed before the plate laminating step, each of the check holes is formed so that centers of the check holes are aligned in-line in the plate-laminating-direction when the plates are laminated in a predetermined relative position; and a step of checking alignment of the centers of the check holes in the plate-laminating-direction.

11. A manufacturing method as in claim 10, wherein the check holes are formed to be geometrically similar and are formed so that the size of area of each check holes becomes larger as the plate positioned farther from the plate positioned at one side of the laminated plates.

12. A manufacturing method as in claim 11, wherein the first positioning hole, the second positioning hole, and the check hole formed in each of the plates are formed as different holes.

* * * * *